US009244586B2

(12) United States Patent
Bachman et al.

(10) Patent No.: US 9,244,586 B2
(45) Date of Patent: Jan. 26, 2016

(54) DISPLAYING A BUY/DOWNLOAD BUTTON BASED ON PURCHASE HISTORY

(71) Applicant: APPLE INC., Cupertino, CA (US)

(72) Inventors: William Bachman, San Jose, CA (US); Imran Chaudhri, San Francisco, CA (US); Jeffrey L. Robbin, Los Altos, CA (US); Policarpo B. Wood, San Jose, CA (US); Elbert D. Chen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/843,407

(22) Filed: Mar. 15, 2013

(65) Prior Publication Data

US 2014/0114808 A1    Apr. 24, 2014

Related U.S. Application Data

(60) Provisional application No. 61/714,717, filed on Oct. 16, 2012.

(51) Int. Cl.
*G06Q 30/00* (2012.01)
*G06F 3/0481* (2013.01)
(Continued)

(52) U.S. Cl.
CPC .............. *G06F 3/0481* (2013.01); *G06F 3/048* (2013.01); *G06F 17/30752* (2013.01);
(Continued)

(58) Field of Classification Search
CPC . G06F 3/0481; G06F 17/30752; G06F 3/048; G06Q 30/0641; G06Q 30/0643; G06Q 30/0623; H04L 67/22; H04L 67/306; H04L 63/10
See application file for complete search history.

(56) References Cited

U.S. PATENT DOCUMENTS 6,248,946 B1   6/2001   Dwek
7,584,291 B2   9/2009   McDowall et al.
(Continued)

FOREIGN PATENT DOCUMENTS

EP    1024661 A2    8/2000

OTHER PUBLICATIONS

International Search Report and Written Opinion mailed Dec. 9, 2014 for PCT Patent Application No. PCT/US2013/064974, 13 pages.
(Continued)

*Primary Examiner* — William Allen
*Assistant Examiner* — Anand Loharikar
(74) *Attorney, Agent, or Firm* — Kilpatrick Townsend & Stockton LLP

(57) ABSTRACT

Methods, systems, computer-readable media, and apparatuses for providing enhanced user interfaces and functionalities for internet radio applications are presented. In some embodiments, a computer system may provide a user interface that includes one or more regions configured to control playback of an internet radio station. The computer system then may determine, based on music purchase history associated with a user account, whether a selected song associated with the internet radio station has been previously purchased. In response to determining that the selected song has not been previously purchased, the computer system may display a user-selectable control that enables the selected song to be purchased. On the other hand, in response to determining that the selected song has been previously purchased, the computer system may display a user-selectable control that enables the selected song to be downloaded.

24 Claims, 22 Drawing Sheets

(51) Int. Cl.
  *G06Q 30/06* (2012.01)
  *G06F 17/30* (2006.01)
  *G06F 3/048* (2013.01)
  *H04L 29/08* (2006.01)
  *H04L 29/06* (2006.01)

(52) U.S. Cl.
  CPC ....... *G06Q 30/0623* (2013.01); *G06Q 30/0641* (2013.01); *G06Q 30/0643* (2013.01); *H04L 63/10* (2013.01); *H04L 67/22* (2013.01); *H04L 67/306* (2013.01)

(56) References Cited

U.S. PATENT DOCUMENTS

| | | | |
|---|---|---|---|
| 7,642,443 B2 * | 1/2010 | Gould et al. | 84/615 |
| 7,672,873 B2 * | 3/2010 | Kindig et al. | 705/26.1 |
| 7,783,722 B1 | 8/2010 | Rosenberg et al. | |
| 8,060,635 B2 | 11/2011 | Rosenberg et al. | |
| 8,200,602 B2 | 6/2012 | Farelly | |
| 8,260,656 B1 | 9/2012 | Harbick et al. | |
| 8,543,665 B2 | 9/2013 | Ansari et al. | |
| 8,666,524 B2 | 3/2014 | Ben-Yaacov et al. | |
| 8,732,193 B2 | 5/2014 | Skeen et al. | |
| 8,977,770 B2 | 3/2015 | Evans et al. | |
| 2002/0112237 A1 | 8/2002 | Kelts | |
| 2005/0193094 A1 | 9/2005 | Robbin et al. | |
| 2005/0197906 A1 | 9/2005 | Kindig et al. | |
| 2006/0195789 A1 | 8/2006 | Rogers et al. | |
| 2006/0212442 A1 | 9/2006 | Conrad et al. | |
| 2006/0212444 A1 | 9/2006 | Handman et al. | |
| 2007/0039031 A1 | 2/2007 | Cansler et al. | |
| 2007/0061759 A1 | 3/2007 | Klein | |
| 2007/0078772 A1 | 4/2007 | Dadd | |
| 2007/0208718 A1 | 9/2007 | Javid et al. | |
| 2008/0222546 A1 | 9/2008 | Mudd et al. | |
| 2008/0256088 A1 | 10/2008 | Bill | |
| 2009/0055376 A1 | 2/2009 | Slaney et al. | |
| 2009/0153389 A1 | 6/2009 | Kerr et al. | |
| 2009/0164654 A1 | 6/2009 | Krstulich | |
| 2009/0254933 A1 | 10/2009 | Gupta et al. | |
| 2009/0271283 A1 | 10/2009 | Fosnacht et al. | |
| 2010/0031366 A1 | 2/2010 | Knight et al. | |
| 2010/0131844 A1 | 5/2010 | Wohlert | |
| 2010/0185655 A1 * | 7/2010 | Mirrashidi et al. | 707/769 |
| 2010/0268360 A1 | 10/2010 | Ingrassia et al. | |
| 2011/0004330 A1 | 1/2011 | Rothkopf et al. | |
| 2011/0213769 A1 | 9/2011 | Handman et al. | |
| 2012/0185488 A1 | 7/2012 | Oppenheimer | |
| 2012/0226536 A1 | 9/2012 | Kidron | |
| 2012/0233701 A1 | 9/2012 | Kidron | |
| 2012/0323938 A1 * | 12/2012 | Skeen et al. | 707/754 |
| 2013/0003993 A1 | 1/2013 | Michalski et al. | |
| 2013/0263173 A1 | 10/2013 | McCoy et al. | |
| 2014/0115467 A1 | 4/2014 | Bachman et al. | |
| 2014/0122593 A1 | 5/2014 | Bachman et al. | |
| 2014/0123004 A1 | 5/2014 | Chaudhri et al. | |
| 2014/0123005 A1 | 5/2014 | Forstall et al. | |
| 2014/0123006 A1 | 5/2014 | Chen et al. | |
| 2015/0012660 A1 | 1/2015 | Kuulusa | |

OTHER PUBLICATIONS

International Search Report and Written Opinion mailed May 16, 2014 for PCT Patent Application No. PCT/US2013/065005, 13 pages.
Non-Final Office Action for U.S. Appl. No. 13/843,153, mailed Feb. 12, 2015, 35 pages.
International Preliminary Report on Patentability mailed Apr. 30, 2015 for PCT Patent Application No. PCT/US2013/065005, 7 pages.
International Search Report and Written Opinion mailed Jun. 18, 2014 for PCT Patent Application No. PCT/US2013/064982, 14 pages.
Non-Final Office Action for U.S. Appl. No. 13/843,273, mailed Apr. 10, 2015, 23 pages.
International Preliminary Report on Patentability mailed Apr. 30, 2015 for PCT Patent Application No. PCT/US2013/064974, 6 pages.
International Preliminary Report on Patentability mailed Jun. 11, 2015 for PCT Patent Application No. PCT/US2013/064982, 8 pages.
Final Office Action for U.S. Appl. No. 13/843,153, mailed Oct. 29, 2015, 29 pages.
Final Office Action for U.S. Appl. No. 13/913,669, mailed Nov. 4, 2015, 9 pages.

* cited by examiner

DISPLAYING A BUY/DOWNLOAD BUTTON BASED ON PURCHASE HISTORY

CROSS REFERENCE TO RELATED APPLICATION

This application claims the benefit under 35 USC §119(e) to U.S. Provisional Patent Application No. 61/714,717 filed on Oct. 16, 2012, the contents of which are incorporated by reference herein in its entirety for all purposes.

BACKGROUND

Aspects of the disclosure generally relate to computing devices and computer software. In particular, some embodiments relate to enhanced features, improved user interfaces, and other user interaction technologies that can be implemented by and/or otherwise embodied in computing devices and computer software that provide internet radio functionalities.

Increasingly, people are using electronic devices to purchase and consume digital content, including books, music, movies, and applications. One way of consuming digital content that is becoming more and more popular is "internet radio." Internet radio generally refers to streaming music that is provided over the internet and/or other network connections to various computing devices, including desktop computers, laptop computers, and mobile devices, such as smart phones, tablet computers, and other mobile computing devices.

Some internet radio applications and services are similar to traditional radio services provided by broadcast radio stations, in that the music, advertisements, and/or other content that is broadcast and/or otherwise played is centrally controlled by a single entity, such as a disc jockey or "DJ," for a relatively large number of listeners. In other internet radio applications and services, the advertisements, music, and/or other content that is broadcast and/or otherwise played is selected for and played to a narrower, and sometimes individual, audience.

For example, some conventional internet radio systems may allow a user to create an internet radio station based on one or more content seeds. Like a traditional radio station, an internet radio station may represent a media channel via which a particular selection of songs and/or other content is provided, but for an internet radio station, the selection of songs that is provided may be defined based on the one or more content seeds. Typically, the content seeds are songs, albums, or artists that are selected by the user based on their individual tastes and interests. These conventional internet radio stations then may select one or more songs for the created internet radio station based on the content seeds provided by the user. The selected songs then may be provided to the user, for instance, via a streaming network connection.

While conventional systems can provide basic internet radio services, as discussed above, these services often require a great deal of configuration on the part of the user. In addition, these services might have only limited insight into a user's tastes, interests, and/or other preferences, including the user's music preferences. Further, while some conventional internet radio systems may be used as a way of advertising and/or offering music for sale to listening users, it may be inconvenient and confusing for users to purchase music using these conventional systems. Moreover, while some conventional internet radio systems may allow a user to share an internet radio station with another user, such sharing capabilities are typically very basic and cannot handle a user's future changes in preferences and/or configuration settings, which might affect a previously shared internet radio station.

BRIEF SUMMARY

Certain embodiments are described that enable a user of an internet radio system to more easily and conveniently use internet radio services and applications.

In some embodiments, a computer system may determine, based on purchase history associated with a user account, one or more content seeds for at least two internet radio stations. The computer system then may select one or more songs to be provided via the at least two internet radio stations based on the one or more content seeds. Subsequently, the computer system may provide the at least two internet radio stations to one or more user devices linked to the user account.

In some embodiments, a computer system may provide a user interface that includes one or more regions configured to control playback of an internet radio station. The computer system then may determine, based on music purchase history associated with a user account, whether a selected song associated with the internet radio station has been previously purchased. In response to determining that the selected song has not been previously purchased, the computer system may display a user-selectable control that enables the selected song to be purchased. On the other hand, in response to determining that the selected song has been previously purchased, the computer system may display a user-selectable control that enables the selected song to be downloaded.

In some embodiments, a computing device that is linked to a first user account may receive a request to share an internet radio station with a second user account. Additionally, the internet radio station may be defined based on one or more parameters associated with the first user account. Thereafter, based on modification of the one or more parameters, the computing device may cause the internet radio station to be dynamically updated for the second user account.

DETAILED DESCRIPTION

Figure 1:
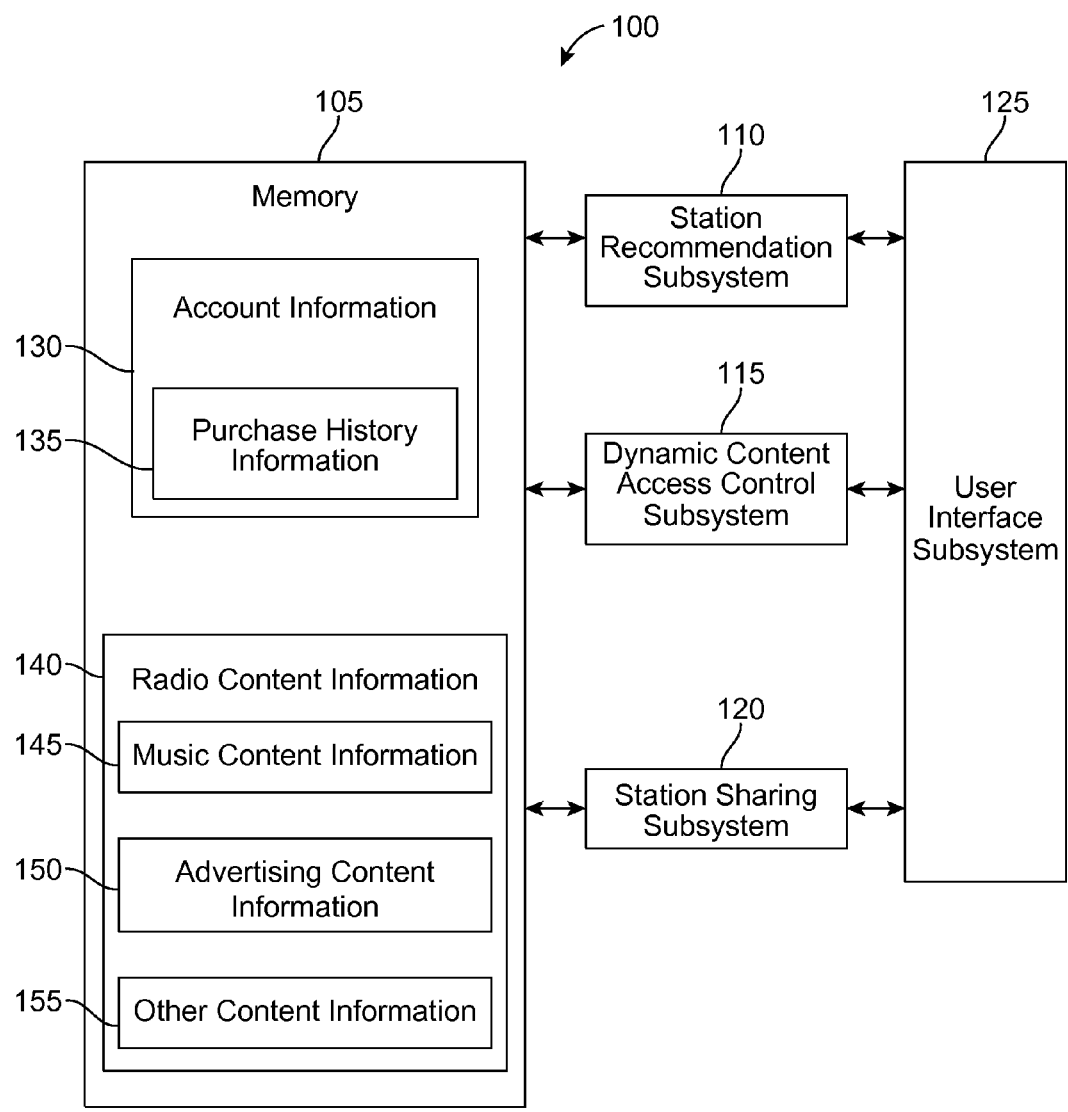
FIG. 1 illustrates a simplified diagram of a system that may incorporate one or more embodiments of the invention.

In the following description, for the purposes of explanation, specific details are set forth in order to provide a thorough understanding of embodiments of the invention. However, it will be apparent that various embodiments may be practiced without these specific details.

Certain embodiments of the present invention relate to internet radio functionalities and user interface features that enable a user to more easily and conveniently use internet radio services and applications.

In some embodiments, a number of different recommended internet radio stations may be provided to a user of a computing device. The recommended internet radio stations may be automatically selected by the computing device based on the user's purchase history (e.g., based on songs and other content items that the user may have purchased, such as purchased using an online music store). By recommending multiple internet radio stations, including internet radio stations that may be dynamically created in response to such recommendations, to a user based on purchase history information associated with the user's user account, a device may be able to provide recommendations regarding internet radio stations that are more closely tailored to the user's tastes, interests, and/or other preferences, while reducing the extent to which an internet radio application might otherwise need to be manually configured.

In some additional and/or alternative embodiments, a dynamic content access control may be provided to a user of an internet radio system in one or more user interfaces. Such a dynamic content access control may, for instance, appear in different states, allowing a user different access rights to a particular song or content item based on the user's purchase history. For example, if a user has not previously purchased a particular song or content item, a dynamic content access control may be displayed as a buy button that allows a user to purchase the song or other content item with respect to which the dynamic content access control is displayed. On the other hand, if the user has previously purchased the particular song or content item, then the dynamic content access control may appear as a download button that allows the user to download the particular song or content item with respect to which the dynamic content access control is displayed. This may allow a user to more conveniently purchase and/or download songs that are played in connection with an internet radio station, while reducing the extent to which a user might otherwise worry about accidentally purchasing the same song or content items multiple times.

In some additional and/or alternative embodiments, an internet radio station that is shared with one or more recipient users may be automatically updated, after the station is shared, based on changes made to the internet radio station by the user who initially created the internet radio station. These features may, for example, enable a user to more conveniently manage what and how they share with others in an internet radio environment.

As used herein, a streaming media station (e.g., an "internet radio station") may refer to a media channel or other content stream that is or can be used to provide streaming music. For example, a streaming media station (e.g., an internet radio station) may be a dynamically generated content stream via which one or more songs and/or other content is provided to a user of a user device. In addition, the one or more songs and/or other content that is provided via a streaming media station (e.g., an internet radio station) may be selected (e.g., by one or more central servers, by the user device itself, etc.) based on one or more content seeds that may be associated with the streaming media station (e.g., the internet radio station). These content seeds may, for instance, include the names of particular songs, albums, artists, genres, and/or the like, and may define the types of songs and/or other content that is ultimately played back and/or otherwise provided via a streaming media station (e.g., an internet radio station).

An "internet radio application" may refer to a software application that provides or is configured to provide one or more internet radio stations. For example, an internet radio application may be a software application that is executed on or configured to be executed on a user device, and which provides one or more internet radio stations to one or more users of the user device.

An "internet radio system" may refer to a computing device or other system that provides or is configured to provide one or more internet radio stations and/or one or more internet radio applications. For example, an internet radio system may be a user device that provides or is configured to provide one or more internet radio stations and/or one or more internet radio applications to one or more users of the user device. As another example, an internet radio system may be a cloud server or other computer server that provides or is configured to provide one or more internet radio stations and/or one or more internet radio applications to one or more user devices. As yet another example, an internet radio system may include one or more user devices and one or more cloud servers that operate or are configured to operate in combination to provide one or more internet radio stations and/or one or more internet radio applications.

A "user account" may refer to a user-specific set of profile information that can be defined with respect to a particular user of an internet radio application and/or an internet radio system. A single user account may, for instance, be associated with one particular user of such an application and/or system, but one user may have one or more user accounts. As discussed below, a user account can be used in listening to an internet radio station and/or otherwise consuming internet radio content. In addition, a user account can be used in purchasing songs and/or other content (e.g., from an electronic content store, such as an online music store), and profile information associated with a particular user account may include purchase history information that describes the songs and/or other content that has been purchased using the user account. In some arrangements, a user account can be created and/or used in accessing and/or listening to an internet radio station, an internet radio application, and/or an internet radio system. Additionally, a username and a password may be associated with each user account, and the username and password can be used to log into and access the user account.

Various embodiments will now be discussed in greater detail with reference to the accompanying figures, beginning with FIG. 1.

FIG. 1 illustrates a simplified diagram of an internet radio system 100 that may incorporate one or more embodiments of the invention. In the embodiment illustrated in FIG. 1, system 100 includes a number of subsystems, including a memory 105, a station recommendation subsystem 110, a dynamic content access control subsystem 115, a station sharing subsystem 120, and a user interface subsystem 125. One or more communication paths may be provided that enable the one or more subsystems to communicate with and exchange data with one another. The various subsystems depicted in FIG. 1 may be implemented in software, in hardware, or in combinations thereof. In some embodiments, the software may be stored on a transitory or non-transitory computer-readable medium and/or be executed by one or more processors. For example, the software may be stored in memory 105 in certain embodiments.

It should be appreciated that system 100 may include other components than those depicted in FIG. 1. Further, the example shown in FIG. 1 is only one example of a system that may incorporate some embodiments of the invention. In some other embodiments, system 100 may have more or fewer components than those shown in FIG. 1, may combine two or more components, or may have a different configuration or arrangement of components. In some embodiments, system 100 may be a part of a mobile device, such as a mobile telephone, a smart phone, a tablet computer, or a multifunction device. Examples of mobile devices include, without limitation, the iPhone®, iPod Touch®, and iPad® devices from Apple Inc. of Cupertino, Calif. In some other embodiments, system 100 may be incorporated in other devices, such as desktop computers, set-top boxes, kiosks, and the like. Examples of such devices include the iMac® and Apple TV® devices from Apple Inc. of Cupertino, Calif.

In some embodiments, memory 105 of system 100 may store various types of information, including account information 130 and radio content information 140. Account information 130 may include information describing one or more users and/or one or more user accounts that are used with and/or otherwise accessed using system 100. For example, account information 130 may store one or more usernames, one or more passwords, and/or other account-specific information associated with the one or more users of system 100. In addition, account information 130 may include purchase history information 135.

In some embodiments, purchase history information 135 may include information describing one or more content items that one or more particular users have purchased and/or to which such users otherwise have access privileges. Examples of content items that a user may have purchased or to which a user may otherwise have access privileges include audio content items (e.g., songs, podcasts, etc.), video content items (e.g., television shows, movies, music videos, etc.), executable content items (e.g., games, other applications, etc.), and/or other content items (e.g., electronic books, electronic magazines, electronic newspapers, etc.). Purchase history information 135 thus may include information about any and/or all of these various types of content items, and may further include information specifying which content item(s) have been purchased by which user(s) and/or user account(s).

In some instances, a content item may be considered "purchased" by a user, even though a user has not been charged a monetary amount for accessing and/or otherwise obtaining the content item. For example, some content items may simply be free, while other content items may be obtained using a coupon, gift certificate, voucher, or the like. Purchase history information 135 still may include information about these content items, which may be obtained by one or more particular users, even though such users might not have paid for such content items.

In some embodiments, radio content information 140 may include information associated with one or more internet radio stations. For example, radio content information 140 may include music content information 145, advertising content information 150, and other content information 155. Music content information 145 may include information associated with one or more songs that may be available via the one or more internet radio stations. For example, music content information 145 may include encoded audio data of such songs. This audio data may, for instance, be encoded in any desirable format, such as MPEG-2 Audio Layer III ("MP3"), Advanced Audio Coding ("AAC"), and/or the like. In addition, music content information 145 may include information describing various properties of the one or more songs, such as the name of the performing artist(s), the title of the song(s), the album(s) associated with the song(s), and/or the like. Advertising content information 150 may include information about one or more advertisements that may be broadcasted and/or otherwise played as part of a stream provided in connection with an internet radio station. Like music content information 145, advertising content information 150 may include both encoded audio data, as well as other information that describes the contents, nature, and/or other properties of the various advertisements. Other content information 155 may include other information associated with various internet radio stations.

In some embodiments, radio content information 140 additionally and/or alternatively may include information about one or more user-defined internet radio stations. A "user-defined" internet radio station may, for instance, be an internet radio station that is created by and/or created for a particular user and/or user account. With respect to such user-defined radio stations, music content information 145 may, for instance, include information corresponding to one or more content seeds associated with each station and/or one or more songs that might be played in providing each station. In addition, advertising content information 150 may include one or more advertisements that may be played back and/or otherwise provided in connection with each user-defined internet radio station. Furthermore, other content information 155 may include preferences and/or parameters that may define and/or otherwise affect each user-defined internet radio station. For example, other content information 155 may, for each user-defined internet radio station, include information specifying one or more songs that a user has liked, approved of, and/or otherwise rated in connection with the particular station; one or more songs that a user has skipped while listening to the particular station; one or more songs that a user has banned from playing on the particular station; and/or other information describing the playback history of the particular internet radio station.

In some embodiments, information stored in memory 105 may be used by the other subsystems of internet radio system 100 in performing various functions and providing various features. For example, as discussed in greater detail below with respect to the various subsystems of system 100, one or more subsystems of system 100 may use account information 130, purchase history information 135, radio content information 140, music content information 145, advertising content information 150, and/or other content information 155 in providing internet radio functionalities and/or internet radio user interfaces to one or more users of system 100.

In some embodiments, station recommendation subsystem 110 may enable system 100 to provide a user of the internet radio system with one or more recommended stations. For example, station recommendation subsystem 110 may store information and/or executable instructions that allow station recommendation subsystem 110 to automatically determine content seeds for newly recommended stations, select songs for the newly recommended stations, and/or provide the newly recommended stations to one or more users of system 100. In some instances, providing recommended stations to one or more users of system 100 may include drawing and/or otherwise generating one or more user interfaces, and station recommendation subsystem 110 accordingly may store information and/or executable instructions that allow system 100 to draw and/or otherwise generate these user interfaces. In addition, determining content seeds for the recommended stations may be based on purchase history information 135, as well as other information stored in memory 105. This may allow system 100 to provide a user with one or more recommended internet radio stations that suit the user's individual tastes, interests, and/or other preferences in music and/or other audio content, without requiring the user to manually specify his or her tastes, interests, and/or other preferences in music and/or other audio content. Rather, for a particular user, system 100 may automatically determine the particular user's tastes, interests, and/or other preferences in music and/or other audio content based on the user's purchase history, as reflected by purchase history information 135, and provide recommended internet radio stations in accordance with this determination.

In some embodiments, dynamic content access control subsystem 115 may enable system 100 to provide a user of the internet radio system with a dynamic content access control. A dynamic content access control may, for instance, be a user-selectable button that is linked to and/or otherwise associated with a particular content item included in a user interface, and may allow a user to purchase or download the particular content item based upon the context. For example, upon determining that the associated content item has not been previously purchased, then the dynamic content access control may enable a user to purchase the associated content item. Upon determining that the associated content item has been previously purchased by the user, then the dynamic content access control may enable the user to download or otherwise access the previously-purchased content item. In this manner, the function enabled by the dynamic content access control may dynamically change depending upon the context (e.g., whether the song was previously purchased or not). Accordingly, the user-selectable button may be dynamic in that, depending on whether a particular content item has been previously purchased or not (e.g., as reflected in purchase history information 135), the button may shift in appearance and in functionality between a "buy" state (e.g., to allow a previously unpurchased content item to be purchased) and a "download" state (e.g., to allow a previously purchased content item to be downloaded). This may allow system 100 to more effectively and conveniently provide a user with advertisements and/or offers to purchase music and/or other content items. In particular, in viewing and considering such advertisements and/or other offers, a user may rely on the state of the dynamic content access control as an indication of whether the user has previously purchased the song or other content item being advertised and/or offered. This, in turn, may reduce the user's potential concern that the song or other content item has been previously purchased and the data file corresponding to the song or other content item has simply been lost and requires locating in a local content library or file storage.

In some embodiments, station sharing subsystem 120 may enable system 100 to provide a user of the internet radio system with one or more user interfaces for sharing an internet radio station. In addition, station sharing subsystem 120 also may provide related functionality to enable such sharing. For example, for a user-defined, seed-based internet radio station, station sharing subsystem 120 may be configured to send the station and/or information defining the station to one or more servers, which in turn may share the station and/or the information defining the station with one or more other people and their respective internet radio devices. Additionally or alternatively, station sharing subsystem 120 may be configured to send the station and/or information defining the station directly to the other people and their respective internet radio devices. By sending and/or otherwise sharing the information that defines an internet radio station in these ways, an internet radio system can enable a user to share an internet radio station with another person and/or device, thereby allowing the sharing user to provide the recipient person and/or device with a content selection that is the same as or substantially similar to the content selection experienced by the sharing user when listening to the internet radio station.

In some instances, station sharing subsystem 120 may further allow the shared internet radio station to be updated. For example, as a user adds and/or removes content seeds to and/or from the internet radio station, rates one or more songs played on the internet radio station, skips one or more songs played on the internet radio station, bans one or more songs from playing on the internet radio station, and/or the like, station sharing subsystem 120 can send updated information about the internet radio station to other people (and their devices) which may subscribe to or otherwise receive the shared internet radio station, reflecting the changes to the information defining the internet radio station. This may allow system 100 to provide a user with functionalities and/or user interfaces for sharing internet radio stations more easily and conveniently, as the user can be provided with more control over what is shared with others (e.g., by automatically updating the content that is experienced in connection with the shared internet radio station).

In some embodiments, station recommendation subsystem 110, dynamic content access control subsystem 115, and station sharing subsystem 120 may communicate with and/or otherwise operate in combination with user interface subsystem 125, which may render and/or display one or more user interfaces drawn by and/or otherwise generated by station recommendation subsystem 110, dynamic content access control subsystem 115, and station sharing subsystem 120. In addition, station recommendation subsystem 110, dynamic content access control subsystem 115, and station sharing subsystem 120 may communicate with and/or otherwise operate in combination with user interface subsystem 125 to receive input, including user input provided by a user of system 100 and received by user interface subsystem 125.

In some embodiments, user interface subsystem 125 may provide an interface that allows a user to interact with system 100. For instance, user interface subsystem 125 may enable system 100 to output information to the user. For example, user interface subsystem 125 may include a display device, such as a monitor or a screen. Additionally or alternatively, user interface subsystem 125 may include one or more input devices that allow a user to provide input to system 100. The input devices may include, without limitation, a mouse, a pointer, a keyboard, or other input devices. In some embodiments, user interface subsystem 125 may include a touch-sensitive interface, such as a touch-sensitive display screen (also sometimes referred to as a touch screen), that can both display information to a user and also receive input from the user. For example, user interface subsystem 125 may display and/or otherwise provide one or more user interfaces for controlling one or more internet radio stations. In addition, user interface subsystem 125 may receive one or more user selections via the touch-sensitive display screen, such as one or more user selections of controls included in the one or more user interfaces, to control the one or more internet radio stations.

Figure 2:
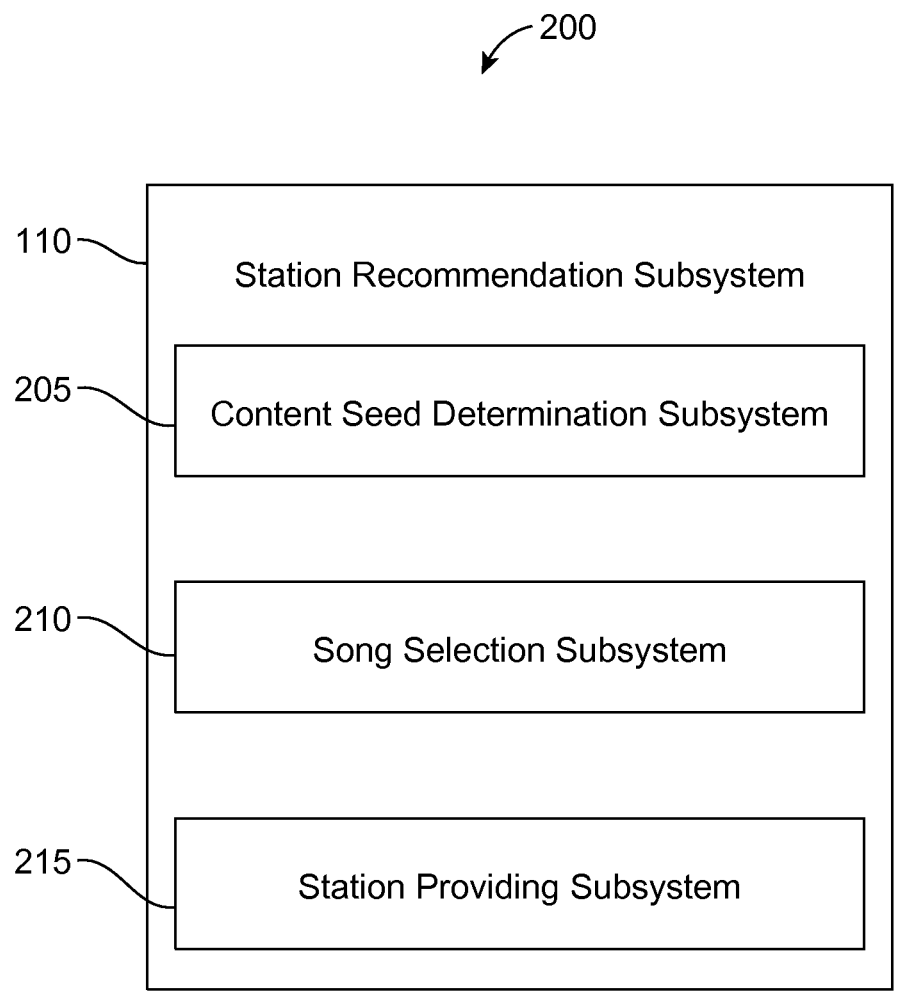
FIG. 2 illustrates a simplified diagram of a station recommendation subsystem according to some embodiments.

FIG. 2 illustrates a simplified diagram of a station recommendation subsystem 200 according to some embodiments. In particular, FIG. 2 illustrates a more detailed view of station recommendation subsystem 110, which is also depicted in FIG. 1. As seen in FIG. 2, station recommendation subsystem 110 may include a number of subsystems, including a content seed determination subsystem 205, a song selection subsystem 210, and a station providing subsystem 215. One or more communication paths may be provided that enable the one or more subsystems to communicate with and exchange data with one another. The various subsystems depicted in FIG. 2 may be implemented in software, in hardware, or in combinations thereof. In some embodiments, the software may be stored on a transitory or non-transitory computer-readable medium and/or be executed by one or more processors.

In some embodiments, content seed determination subsystem 205 may enable one or more content seeds to be determined for one or more recommended internet radio stations. In particular, content seed determination subsystem 205 may determine one or more content seeds for one or more recommended internet radio stations for a particular user based on the user's tastes, interests, and/or preferences. In at least one arrangement, content seed determination subsystem 205 may determine one or more content seeds for one or more recommended internet radio stations based on the user's purchase history. As discussed above, a particular user's purchase history may include information related to audio content items, video content items, executable content items, and other content items that the user may have previously purchased. Using this information, content seed determination subsystem 205 may be able to identify, model, and/or predict the user's tastes, interests, and/or preferences, and accordingly provide recommendations of seed-based internet radio stations.

In some instances, content seed determination subsystem 205 may combine similar information about particular purchases and/or particular purchased content items in different ways to create different internet radio stations and/or different recommendations. For example, a particular content item included in a user's purchase history may be used by content seed determination subsystem 205 in creating two different seed-based internet radio stations that can then be recommended to the user. In some instances, this outcome may result from combining the content seed(s) with different sets of other content seed(s) that may or might not be included in the user's purchase history.

In some embodiments, song selection subsystem 210 may select one or more songs to be played in connection with the one or more recommended internet radio stations based on the content seeds that define and/or are otherwise associated with such stations. For example, song selection subsystem 210 may select one or more songs from an electronic media catalog or other source to be provided in connection with various internet radio stations based on similarities between such songs and the one or more content seeds that define each of the internet radio stations. In some instances, song selection subsystem 210 may consider a song to be similar to a content seed based on the song having a similar genre, a similar time period, a similar artist, a similar composer, a similar musical style, and/or other similar properties as the content seed. In other words, for a particular internet radio station, song selection subsystem 210 may use a similarity measure between a particular song (e.g., which may be included in an electronic media catalog) and the content seed(s) for the internet radio station to determine whether or not the song is to be selected to be played on the station.

In some embodiments, station providing subsystem 215 may provide the one or more recommended internet radio stations to a user of system 100. For example, station providing subsystem 215 may generate one or more user interfaces for offering the recommended internet radio stations to a user of system 100 and/or allowing playback of such internet radio stations to be controlled by the user. In some instances, station providing subsystem 215 may also be configured to generate station posters for each of the recommended stations and/or cause such station posters to be displayed in the user interfaces that are used in providing the recommended internet radio stations to a user of system 100. Such a station poster may, for instance, be station-specific artwork that is generated based on artwork associated with artists, songs, albums, and/or the like that correspond to the music provided in connection with a particular internet radio station.

Figure 3:
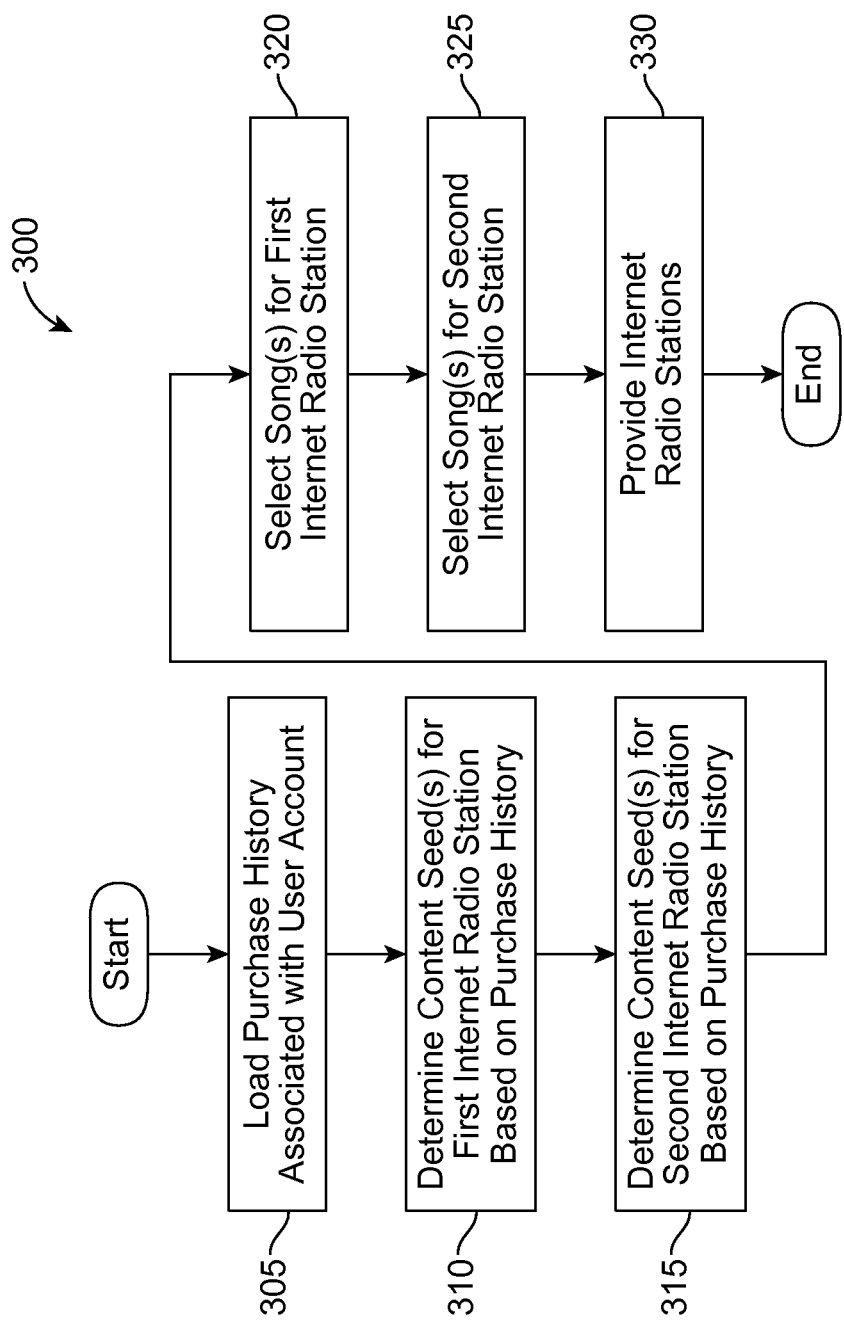
FIG. 3 illustrates a simplified flowchart depicting a method of providing multiple recommended internet radio stations based on purchase history information according to some embodiments.

FIG. 3 illustrates a simplified flowchart 300 depicting a method of providing multiple recommended internet radio stations based on purchase history information according to some embodiments. The processing depicted in FIG. 3 may be implemented in software (e.g., code, instructions, programs, etc.) executed by one or more processors, other hardware, or combinations thereof. The software may be stored on a non-transitory computer-readable storage medium. The particular series of processing steps depicted in FIG. 3 is not intended to be limiting.

Using the method illustrated in FIG. 3, a computing device, such as system 100, may be able to provide a user with a number of different, dynamically-generated internet radio stations that are tailored to match the user's tastes, interests, and preferences. In addition, by using purchase history information that describes content items that the user has previously purchased or otherwise obtained, a number of recommended internet radio stations may be provided to the user without requiring the user to manually specify his or her tastes, interests, and/or other preferences in music and/or other audio content.

As seen in FIG. 3, the method may be initiated in step 305, in which purchase history information associated with a user account may be loaded and/or accessed. In some embodiments, loading purchase history information associated with a particular user account may be performed by system 100 based on a user logging into the particular user account. For example, a user of system 100 may authenticate with and/or otherwise log in to a user account of a number of user accounts provided by system 100. Based on the identity of the user, system 100 may load and/or otherwise access purchase history information associated with the particular user. The purchase history information may be stored by system 100 or may be accessed by system 100 from a remote location. For instance, purchase history information for the user may, in some embodiments, be stored on one or more remote servers. In some instances, loading purchase history information for the user account thus may include accessing such remotely stored purchase history information. In addition, as discussed above, purchase history information for a particular user may include information about audio content items, video content items, executable content items, and/or other content items. Thus, in one example, the purchase history information loaded in step 305 may include at least one music item, at least one video item, at least one application item, and/or at least one book item. Any and/or all of these items may subsequently be used in generating and/or otherwise defining recommended internet radio stations for the user, as discussed in greater detail below.

In step 310, one or more content seeds may be determined for a first internet radio station based on the purchase history information (e.g., the purchase history information loaded in step 305). In some embodiments, determining one or more content seeds for an internet radio station may include generating a seed set that includes items selected from the purchase history information. For example, system 100 may generate a seed set by selecting items from the purchase history information, and the selected items may form or be included in the seed set. In some instances, a seed set may be generated from a single item selected from the purchase history, while in other instances, a seed set may be generated from two or more items selected from the purchase history. In addition, the items selected from the purchase history information and used in generating the seed set may be of different content types. For example, a seed set may be generated based on a music item selected from the purchase history information, such as a song or music album, and a video item selected from the purchase history information, such as a movie or music video.

In some embodiments, a number of different algorithms may be used to select items from the purchase history information to be used as content seeds in the seed set. In addition to using different algorithms, user-specific playback history information, as well as the purchase history information, may be used in selecting items from the purchase history to be used as content seeds in the seed set. For example, songs that are played with greater frequency and/or at particular times of day (e.g., as indicated in the playback history information for the user account associated with the purchase history information) may be more likely to be selected as content seeds for a seed set compared to other songs.

In some embodiments, the seed set may define a content stream that makes up the playback content of the internet radio station. For example, the seed set may specify one or more songs and/or other content items that can be used as a basis in selecting songs, advertisements, and/or other media to be provided via the internet radio station. In some embodiments, prior to generating the seed set and/or otherwise defining a content stream for an internet radio station, a genre first may be set for the internet radio station. For example, before selecting items from the purchase history information to be used as content seeds for a new, recommended internet radio station, system 100 may initially determine a genre of music and/or other content to be played on and/or otherwise provided via the internet radio station. In some instances, such a genre may be determined based on the purchase history information.

In step 315, one or more content seeds may be determined for a second internet radio station based on the purchase history information (e.g., the purchase history information loaded in step 305). Similar to how content seeds may be determined for the first internet radio station, determining one or more content seeds for the second internet radio station may, in some embodiments, include generating a seed set that includes items selected from the purchase history information. In addition, the content seeds determined for the second internet radio station may, in some instances, include one or more of the content seeds determined for the first internet radio station. In other words, in some instances, the first internet radio station and the second internet radio station may have one or more common content seeds, even though the first internet radio station and the second internet radio station may be different from each other (e.g., in that different music and/or other audio content may be provided via each of the two internet radio stations). This may, for example, result from the one or more common content seeds being combined in different ways with other content seeds (e.g., other content seeds that the two internet radio stations do not share) in providing the two internet radio stations.

In step 320, one or more songs may be selected for the first internet radio station. In some embodiments, selecting one or more songs for the first internet radio station may include generating a first song set that includes one or more songs selected based on a seed set for the first internet radio station (e.g., the seed set that may be generated in step 310, as discussed above). In selecting songs for the first internet radio station, system 100 may, for example, use one or more selection algorithms that select songs for the internet radio station based on the similarities and/or differences between such songs and the content seeds (e.g., the content seeds determined for the first internet radio station in step 310). Additionally, the songs may, for example, be selected from an electronic music catalog available to the device selecting songs for the internet radio station (e.g., system 100). In some instances, such an electronic music catalog may be stored locally on the device (e.g., system 100), while in other instances, the electronic music catalog may be stored remotely on one or more servers that are accessible to the device.

In step 325, one or more songs may be selected for the second internet radio station. Similar to how songs may be selected for the first internet radio station, selecting one or more songs for the second internet radio station may, in some embodiments, include generating a second song set that includes one or more songs selected based on a seed set for the second internet radio station (e.g., the seed set that may be generated in step 315, as discussed above). In some embodiments, in selecting songs for the second internet radio station, system 100 may, for example, use one or more selection algorithms like those that can be used in step 320 with respect to the first internet radio station. In some instances, the same selection algorithm(s) used in selecting songs for the first internet radio station may be used in selecting songs for the second internet radio station, while in other instances, one or more different selection algorithms may be used in selecting songs for the different internet radio stations. This may, for instance, allow for greater variety in the content provided via the recommended internet radio stations being created, e.g., by system 100.

In step 330, the first internet radio station and the second internet radio station may be provided. For example, system 100 may, in step 330, provide the first internet radio station and the second internet radio station to the user of the system. In some embodiments, providing the internet radio stations may include displaying and/or otherwise providing one or more user interfaces that are configured to allow a user to control various aspects of the internet radio stations. As discussed below, for instance, an interface for a station may include one or more controls for selecting the internet radio station and/or controlling playback of songs associated with the internet radio station.

In some embodiments, providing the internet radio stations may include generating and/or displaying a station poster for each of the internet radio stations. Such a station poster may, for instance, be an icon or other graphical representation that can be displayed (e.g., by an internet radio application and/or an internet radio system) in connection with a particular internet radio station. In addition, such a station poster may include a description of a seed set used in selecting songs for the corresponding internet radio station. Such a description may, for instance, include one or more song names, one or more artist names, one or more album names, and/or one or more genre names corresponding to the content seed(s) associated with the particular internet radio station.

In some embodiments, when multiple internet radio stations are provided, providing the internet radio stations may include displaying the seed set for each of the internet radio stations and/or allowing a user (e.g., the user of system 100) to modify the seed set for each of the internet radio stations. These features may, for instance, allow the user to modify and/or otherwise control the content provided via each of the particular internet radio stations.

In some embodiments, providing the internet radio stations may include ranking the internet radio stations based on the purchase history information associated with the user account and/or other information associated with the user account. In certain embodiments, higher-ranked internet radio stations may be displayed more prominently (e.g., than lower-ranked internet radio stations). For example, system 100 may rank one internet radio station higher than another internet radio station, based on playback history information indicating that content seeds for the higher-ranked station are played back more frequently by the user than content seeds for the lower-ranked station. These features may, for instance, allow system 100 to better provide recommendations regarding internet radio stations that are suited to the user's tastes, interests, and/or preferences, while reducing the extent to which the user might otherwise be required to manually input this information and/or otherwise configure the system.

Figure 4:
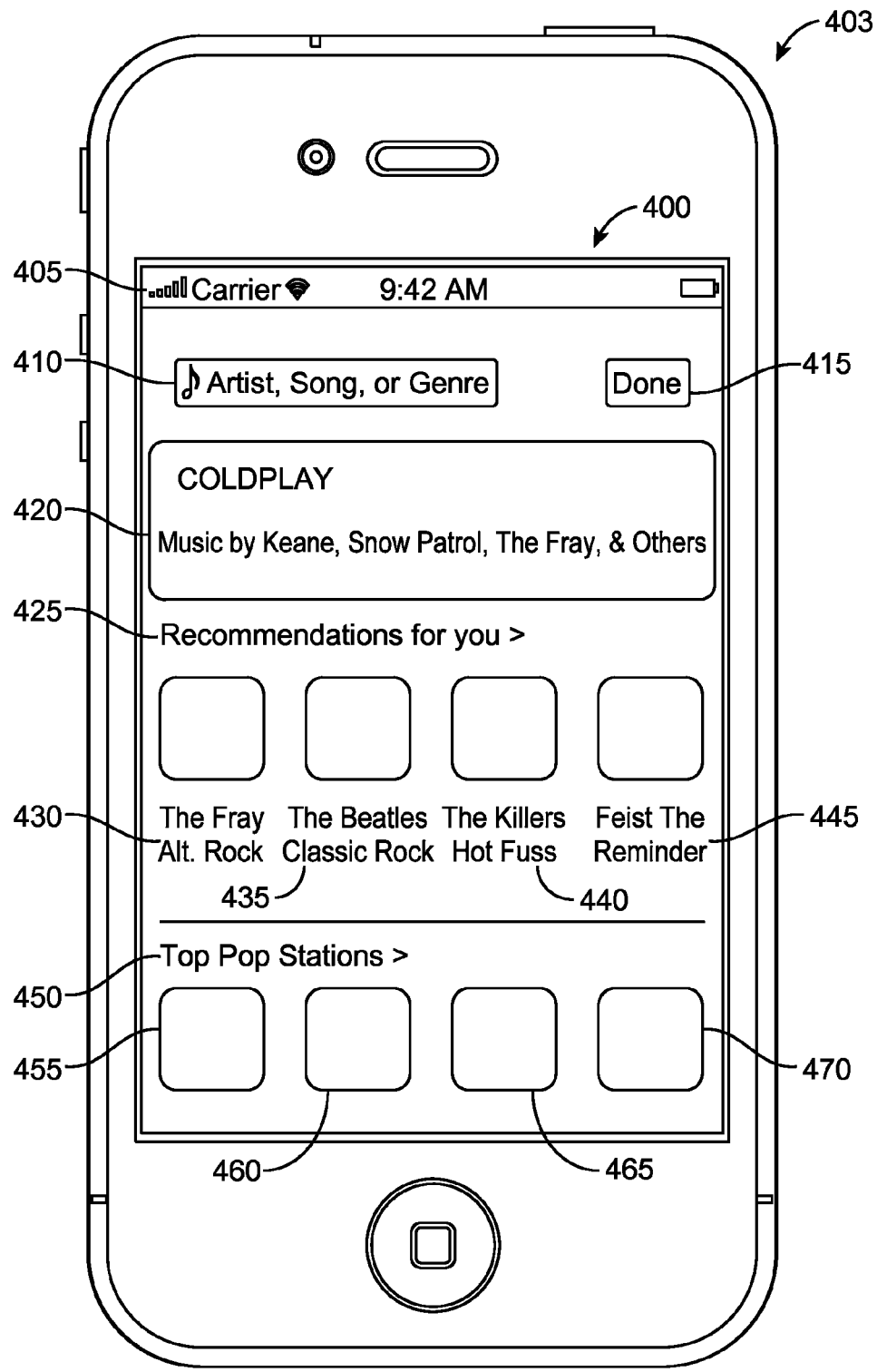
FIGS. 4-6 illustrate examples of user interfaces that may be used in providing multiple recommended internet radio stations based on purchase history information according to some embodiments.
Figure 5:
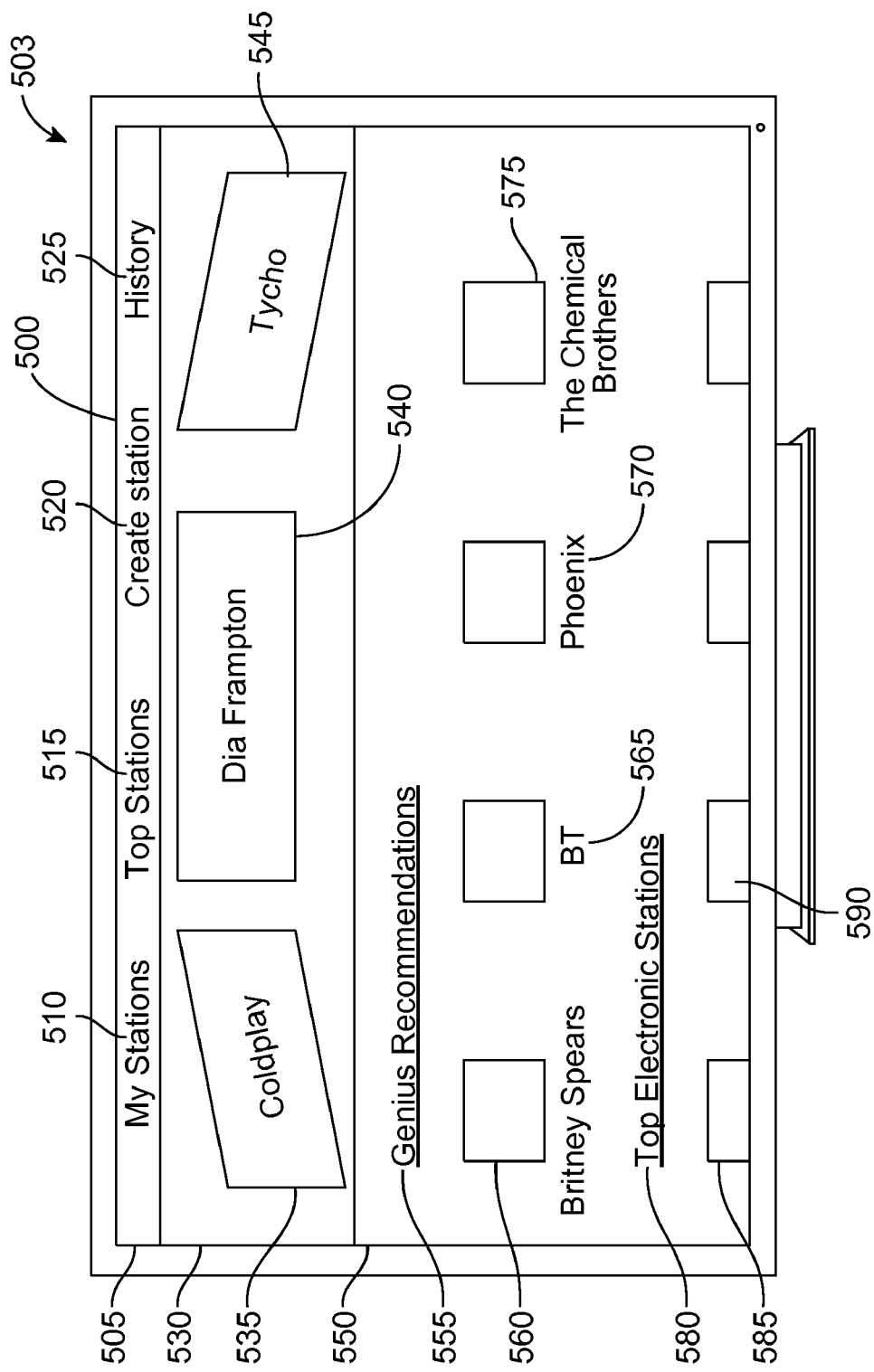
Figure 6:
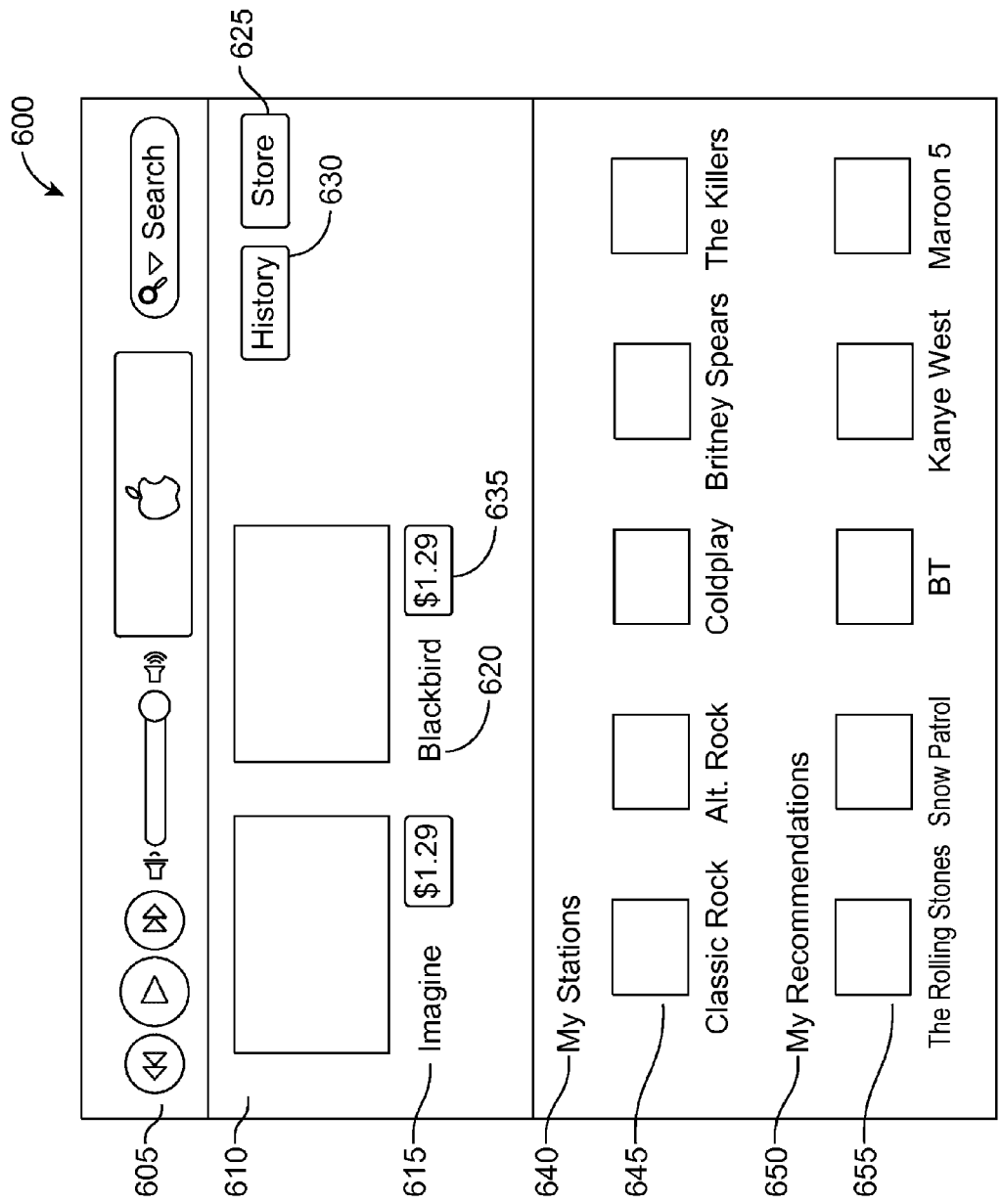

FIGS. 4-6 illustrate examples of user interfaces that may be used in providing multiple recommended internet radio stations based on purchase history information according to some embodiments. In particular, FIG. 4 illustrates an example user interface 400 that may be provided on a mobile computing device 403, FIG. 5 illustrates an example user interface 500 that may be provided on a television 503 via a set-top box or similar computing device, and FIG. 6 illustrates an example user interface 600 that may be provided on a tablet computer, laptop computer, and/or desktop computer. While these example user interfaces are described as being provided via particular types of computing devices and/or other hardware components, these computing devices and/or other hardware components are used only as examples. The user interfaces illustrated in FIGS. 4-6 and discussed in greater detail below thus may be provided using any type(s) of computing device(s) and/or other hardware components, as may be desired.

As seen in FIG. 4, user interface 400 may be displayed by computing device 403 in providing multiple recommended internet radio stations to a user of device 403. In some embodiments, user interface 400 may include status information 405, which may include information describing various aspects of the status of device 403. For example, status information 405 may include signal strength information, clock information, and/or power information associated with device 403.

In some embodiments, user interface 400 further may include a search field 410 in which a user of device 403 can provide character input specifying an artist, song, or genre of music to be searched for. Such a search may, for instance, be carried out with respect to an electronic music catalog stored on and/or otherwise available to device 403. In addition, by searching for a particular artist, song, or genre of music (e.g., using search field 410), a user of device 403 may, for instance, be able to create one or more new internet radio stations based on the results of such searching. For instance, one or more search results may be used as content seed(s) for a new internet radio station. In addition, a submit button 415 may be included in user interface 400, and submit button 415 may be configured to cause a search to be executed based on the contents of search field 410 upon selection by a user of device 403.

In some embodiments, user interface 400 may include one or more banners, such as banner 420, which advertise particular internet radio stations. Such a banner may, for instance, include artwork associated with the artists, songs, or albums that may be played in connection with the particular internet radio station that is the subject of the banner. In some instances, a banner included in user interface 400, such as banner 420, may be used to advertise and/or otherwise offer a dynamically generated internet radio station to a user of the device displaying the user interface.

In some embodiments, user interface 400 further may include a recommendation region 425 in which one or more recommended internet radio stations may be provided. In particular, recommendation region 425 may include one or more station posters, such as station poster 430, station poster 435, station poster 440, and station poster 445. Each of the one or more station posters included in recommendation region 425 may, for instance, correspond to a recommended internet radio station and may be configured to cause playback of the corresponding internet radio station to begin upon being selected (e.g., by a user of device 403). In addition, the recommended internet radio stations corresponding to each of the one or more station posters included in recommendation region 425 may, for instance, be dynamically generated (e.g., by device 403) using various aspects of the methods discussed above. For example, recommendation region 425 may, in some instances, include a number of different internet radio stations that are dynamically generated by device 403 and recommended to a user of device 403, based on purchase history information associated with the user's user account.

In some embodiments, user interface 400 also may include one or more additional station regions, such as station region 450, in which other internet radio stations may be displayed and/or otherwise offered to a user of device 403. For example, station region 450 may include a number of station posters (e.g., station poster 455, station poster 460, station poster 465, and station poster 470) corresponding to internet radio stations that are selected based on their popularity among other users.

As seen in FIG. 5, example user interface 500 may be used in providing recommended internet radio stations to a user of television 503. In some embodiments, such a user interface may be displayed by television 503 and related processing (e.g., of the methods and/or method steps discussed above) may be performed by internal components of television 503, while in other embodiments, such a user interface may be displayed by television 503 and related processing may be performed by an external computing device, such as a set-top box.

In some embodiments, user interface 500 may include a menu bar 505. Menu bar 505 may, for instance, include one or more user-selectable menu options (e.g., option 510, option 515, option 520, option 525, etc.), which may allow a user of television 503 to control various aspects of an internet radio application. For example, user interface 500 may be configured such that option 510, upon selection, causes a user-personalized listing of one or more internet radio stations to be displayed. As another example, user interface 500 may be configured such that option 515, upon selection, causes a listing of one or more popular internet radio stations to be displayed. As still another example, user interface 500 may be configured such that option 520, upon selection, causes an interface to be displayed via which a new internet radio station can be created. As yet another example, user interface 500 may be configured such that option 525, upon selection, causes an interface to be displayed that includes a description of a user's playback history (e.g., a listing of songs played back to the user in providing the one or more internet radio stations).

In some embodiments, user interface 500 further may include a cover flow region 530. Cover flow region 530 may, for instance, allow a user (e.g., a user of television 503) to graphically view and/or scroll through a number of images and/or other graphical representations corresponding to various internet radio stations. In some instances, cover flow region 530 may, for example, include one or more station posters, such as the station posters discussed above. As seen in the example illustrated in FIG. 5, for instance, cover flow region 530 may include a first station poster 535, a second station poster 540, and a third station poster 545. Station poster 535 may, for example, include artist artwork and/or album artwork corresponding to one or more content seeds associated with the internet radio station to which station poster 535 corresponds. Station posters 540 and 545 may likewise include similarly selected artwork for their respective internet radio stations. In addition, each of the station posters included in cover flow region 530 may be selectable by a user to cause playback of the internet radio station corresponding to the particular station poster to begin.

In some embodiments, user interface 500 also may include a station listing region 550. Station listing region 550 may, for instance, include a recommendation region 555 in which one or more recommended internet radio stations may be provided. In particular, recommendation region 555 may be similar to recommendation region 425 (e.g., as illustrated in FIG. 4 and discussed above). Like recommendation region 425, recommendation region 555 of FIG. 5 may include one or more station posters (e.g., station poster 560, station poster 565, station poster 570, and station poster 575), and each of the station posters may correspond to a recommended internet radio station. In addition, station listing region 550 of user interface 500 may include one or more additional station regions, such as station region 580, in which other internet radio stations may be displayed and/or otherwise offered to a user (e.g., a user of device 403). For example, station region 580 may include a number of station posters (e.g., station poster 585, station poster 590, etc.) corresponding to internet radio stations that are selected based on their popularity among other users.

As seen in FIG. 6, example user interface 600 may be used in providing recommended internet radio stations to a user of a tablet computer, a laptop computer, a desktop computer, or any other type of computing device. In some embodiments, user interface 600 may include a control bar 605, which may include one or more controls for controlling playback of an internet radio station and/or other media items. For example, control bar 605 may include play, fast-forward, and/or rewind controls, one or more sound volume controls, one or more status indicators, and/or one or more search controls. While these controls are listed as examples of the controls that may be included in control bar 605, additional and/or alternative controls may similarly be provided in user interface 600 and/or control bar 605 in other embodiments.

In some embodiments, user interface 600 further may include a cover flow region 610. Cover flow region 610 may, for instance, include album artwork and/or song listings of one or more songs previously played back in connection with and/or otherwise provided via one or more internet radio stations. For example, cover flow region 610 may include a first song listing 615, which may correspond to a song that was previously played on an internet radio station provided via user interface 600. In addition, cover flow region 610 may include a second song listing 620, which may correspond to another song that was previously played on an internet radio station provided via user interface 600. In some instances, the songs corresponding to song listing 615 and song listing 620 may have been played on the same internet radio station, while in other instances, these songs might have been played on different internet radio stations (e.g., if a user jumped from a first internet radio station to a second internet radio station). In some additional and/or alternative instances, second song listing 620 may represent a song that is currently playing on and/or otherwise in connection with an internet radio station provided via user interface 600.

In some embodiments, user interface 600 and/or cover flow region 610 further may include one or more controls that enable songs and/or other content items provided in connection with the internet radio stations to be purchased and/or downloaded. An example of such a control is purchase button 635, which may allow a user to purchase the song corresponding to song listing 620. These controls are described in greater detail below with respect to other embodiments.

In some embodiments, user interface 600 and/or cover flow region 610 also may include additional controls, such as store button 625 and history button 630. Store button 625 may, for instance, allow a user to access an online music store in which content items, such as songs, movies, television shows, and so on, may be purchased. In addition, history button 630 may allow a user to view a playback history associated with one or more internet radio stations provided to and/or accessed by the user and/or the user account associated with the user.

In some embodiments, user interface 600 also may include a station listing region 640 in which one or more internet radio stations may be provided to a user. In particular, station listing region 640 may include one or more station posters 645, which may correspond to various internet radio stations selected and/or saved by the user. In addition, user interface 600 may include a recommendation region 650 in which one or more recommended internet radio stations may be provided. Like the recommendation regions illustrated in FIGS. 4 and 5 and discussed above with respect to these figures, recommendation region 650 of FIG. 6 may include one or more station posters 655. Each of the station posters 655 may, for instance, correspond to a recommended internet radio station.

Figure 7:
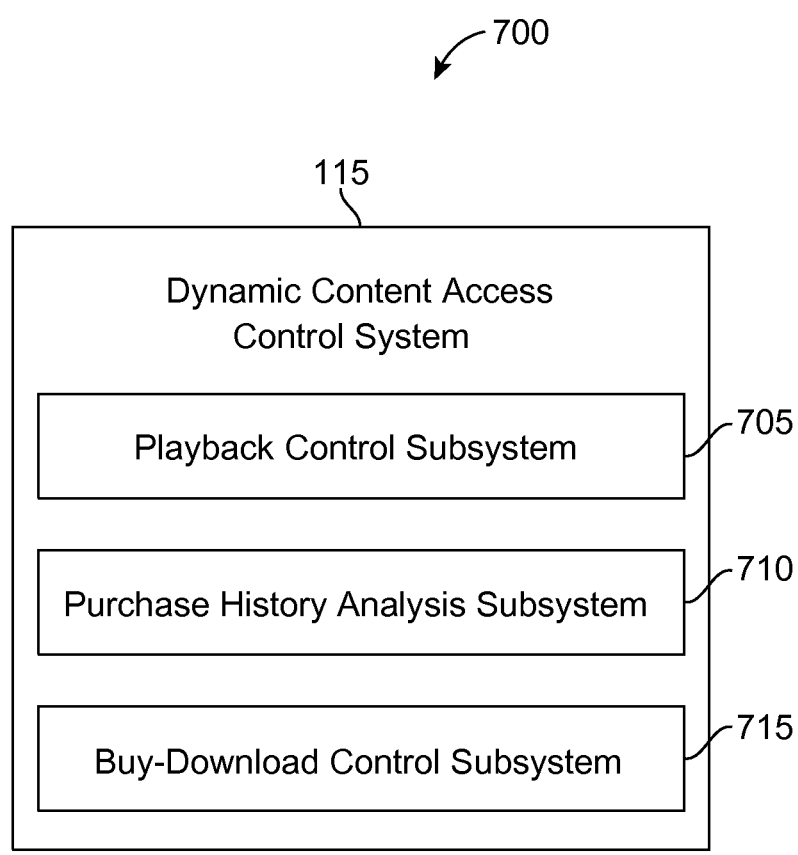
FIG. 7 illustrates a simplified diagram of a dynamic content access control subsystem according to some embodiments.

FIG. 7 illustrates a simplified diagram of a dynamic content access control subsystem 700 according to some embodiments. In particular, FIG. 7 illustrates a more detailed view of dynamic content access control subsystem 115, which is also depicted in FIG. 1. As seen in FIG. 7, dynamic content access control subsystem 115 may include a number of subsystems, including a playback control subsystem 705, a purchase history analysis subsystem 710, and a buy-download control subsystem 715. One or more communication paths may be provided that enable the one or more subsystems to communicate with and exchange data with one another. The various subsystems in FIG. 7 may be implemented in software, in hardware, or in combinations of thereof. In some embodiments, the software may be stored on a transitory or non-transitory computer-readable medium and/or be executed by one or more processors.

In some embodiments, playback control subsystem 705 may draw and/or generate one or more user interfaces and/or one or more user interface regions that include one or more controls (e.g., one or more buttons, menus, sliders, text boxes, etc.) for controlling internet radio stations. Such controls may, for instance, allow a user (e.g., a user of system 100) to control creation, selection, playback, sharing, and/or other functionalities associated with internet radio stations and/or provided by a device, such as system 100, that may implement playback control subsystem 705. For example, such controls may include one or more buttons for rating songs played on an internet radio station, one or more controls for adding songs to an internet radio station, one or more controls for banning songs from an internet radio station, one or more controls (e.g., a slider control) for editing a popularity mix of songs played in connection with an internet radio station, and/or other controls.

In addition, the user interfaces and/or user interface regions that can be drawn and/or generated by playback control subsystem 705 also may include user interface regions and/or controls for controlling playback of content items included in a content library associated with a user account (e.g., a user account of the user of system 100). In some embodiments, such a content library may be locally stored on the device providing the user interface(s) and/or user interface region(s) associated with playback control subsystem 705. For example, such a content library may be stored in memory 105 of system 100, and playback of content items in the content library may be controlled by playback control subsystem 705.

In some instances, the user interface(s) and/or user interface region(s) also may include controls for displaying one or more additional user interfaces and/or user interface regions for purchasing and/or otherwise obtaining new content, e.g., from an electronic content store. For example, the user interfaces and/or user interface regions may include controls and/or user interface regions for viewing one or more songs in an online music store.

In some instances, the user interfaces and/or user interface regions provided by playback control subsystem 705 also may include controls and/or user interface regions for viewing internet radio playback history. For example, playback control subsystem 705 may draw and/or otherwise generate one or more user interface regions and/or controls for viewing playback history information associated with one or more internet radio stations that have been accessed by and/or are accessible to the user of the device (e.g., system 100).

In some embodiments, purchase history analysis subsystem 710 may store and/or access purchase history information associated with one or more user accounts to determine if one or more songs and/or other content items have been previously purchased and/or are otherwise accessible to the user. Such purchase history information may, for instance, be stored in memory 105 of system 100, as discussed above, and/or may be stored by one or more remote servers that can be accessed by system 100.

In some instances, purchase history analysis subsystem 710 also may authenticate a user of the device (e.g., a user of system 100), so as to determine an active user account with respect to which one or more internet radio stations may be provided. In addition, purchase history analysis subsystem 710 may, in some instances, register the device with one or more servers that may provide internet radio services and/or other digital content services, so as to associate one or more user accounts (e.g., one or more user accounts associated with the user or users of system 100) with the device.

In some embodiments, buy-download control subsystem 715 may generate one or more dynamic access controls with respect to one or more songs and/or one or more other content items included in a user interface, such as a user interface and/or user interface region drawn and/or otherwise generated by playback control subsystem 705. In addition, buy-download control subsystem 715 may communicate with and/or cause system 100 to communicate with one or more other devices and/or servers to cause a user account (e.g., a user account for the user of system 100) to be charged when a song or other content item is purchased. Buy-download control subsystem 715 may, for instance, similarly communicate with and/or cause system 100 to communicate with one or more other devices and/or servers to cause a download to be initiated after a song or other content item has been purchased, and/or when access rights already exist with respect to such a song or other content item and a download command is received (e.g., from a user of system 100 via a user interface).

Figure 8:
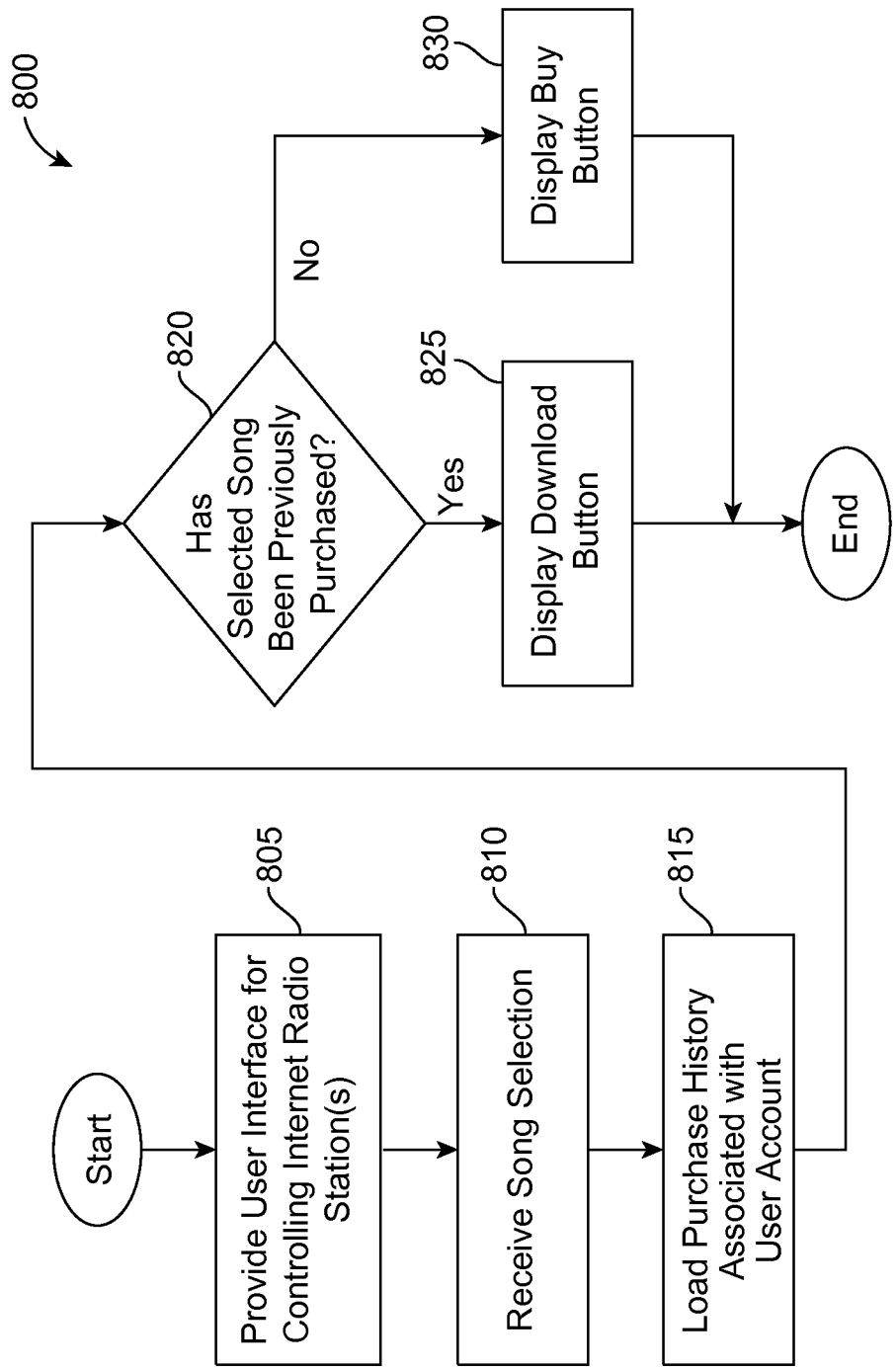
FIG. 8 illustrates a simplified flowchart depicting a method of providing a dynamic content access control according to some embodiments.

FIG. 8 illustrates a simplified flowchart 800 depicting a method of providing a dynamic content access control according to some embodiments. The processing depicted in FIG. 8 may be implemented in software (e.g., code, instructions, programs, etc.) executed by one or more processors, other hardware, or combinations thereof. The software may be stored on a non-transitory computer-readable storage medium. The particular series of processing steps depicted in FIG. 8 is not intended to be limiting.

Using the method illustrated in FIG. 8, a computing device, such as system 100, may be able to provide a user with more convenient ways of listening to internet radio stations and/or purchasing and downloading songs that are played on such stations from an online music store. In particular, by using this method, a dynamic buy-download button may be provided in connection with each of the one or more songs that are displayed in a user interface of an internet radio application, where the particular button corresponding to each song accounts for whether the user has previously purchased the song (e.g., and thus may only wish to download the song) or whether the user has not previously purchased the song (e.g., and thus may wish to both purchase and download the song).

As seen in FIG. 8, the method may be initiated in step 805, in which a user interface for controlling one or more internet radio stations may be provided. In some embodiments, a user interface for controlling one or more internet radio stations may be provided by system 100. For example, system 100 and/or playback control subsystem 705 of dynamic content access control subsystem 115 may generate and/or otherwise draw a user interface that includes one or more controls for controlling one or more internet radio stations. As discussed above, such a user interface may, in some instances, also include controls for controlling playback of content items included in a local content library.

In step 810, a song selection may be received. For example, in step 810, a user may select a particular song displayed in a user interface (e.g., by clicking on or tapping on text, graphics, and/or another indicator associated with the song). System 100 then may receive the user's selection as user input.

Subsequently, in step 815, purchase history information associated with a user account for the user may be loaded. For example, in step 815, system 100 and/or purchase history analysis subsystem 710 may load and/or access purchase history information and/or other information associated with the user. In some instances, this may include authenticating the user (e.g., by having the user enter a username and password associated with a digital content store, such as an online music store).

In step 820, it may be determined whether the selected song was previously purchased by the user. In some embodiments, this determination may be based on the purchase history information associated with the user account. For example, in step 820, system 100 and/or purchase history analysis subsystem 710 of dynamic content access control subsystem 115 may determine whether the purchase history information for the user account indicates that the selected song has been previously purchased. Additionally or alternatively, purchase history analysis subsystem 710 of dynamic content access control subsystem 115 and/or system 100 may determine whether the user of the user account otherwise has rights to access the selected song (e.g., if the selected song is available for free and/or if the user has otherwise previously acquired rights to the song). Thus, determining that the selected song has been previously purchased may, in some embodiments, simply include determining whether the user has rights to access the song, as, in some instances, the user might not have had to pay any monetary amount for the song to be considered "purchased" by the user.

If it is determined in step 820 that the selected song was previously purchased, then in step 825, system 100 and/or buy-download control subsystem 715 of dynamic content access control subsystem 115 may display a download button. This may, for instance, include displaying a download button adjacent to and/or in the vicinity of a control or other indicator in the user interface corresponding to the selected song. In addition, the download button may, for instance, be a user-selectable button or other control that enables the user to download the selected song. For example, the download button may be configured such that upon being selected by the user in the user interface, a download of the song or other corresponding content item with respect to which the download button is displayed, may be initiated.

On the other hand, if it is determined in step 820 that the selected song has not been previously purchased by the user, then in step 830, a buy button may be displayed. For example, system 100 and/or buy-download control subsystem 715 of dynamic content access control subsystem 115 may display a buy button in connection with the selected song. This may, for instance, include displaying a buy button adjacent to and/or in the vicinity of a control or other indicator in the user interface corresponding to the selected song. In addition, the buy button may enable the selected song to be purchased by the user. For example, the buy button may be configured such that upon being selected by the user in the user interface, a purchase and subsequent download of the selected song may be initiated. This may, for instance, include causing the user account of the user to be charged a monetary amount for the purchase of the song. In other instances, a coupon or other voucher may be redeemed, or the song may be considered "purchased" for free, in which cases the user might not need to be charged any monetary amount for the song.

Figure 9:
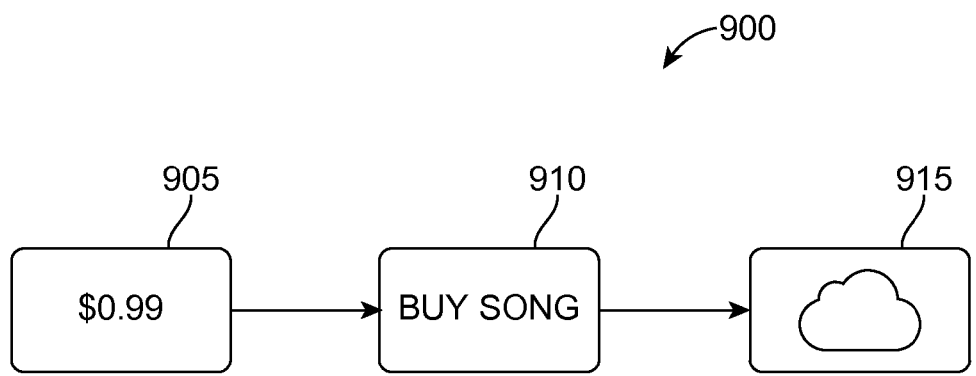
FIG. 9 illustrates example states of a dynamic content access control according to some embodiments.

FIG. 9 illustrates example states 900 of a dynamic content access control according to some embodiments. In particular, as seen in FIG. 9, a dynamic content access control may initially be displayed in a user interface as a buy button 905. Buy button 905 may, for instance, include a price or monetary amount associated with purchasing a song or other content item corresponding to the button. While buy button 905 is illustrated as including a price in the example depicted in FIG. 9, in other instances, a buy button may include additional and/or alternative text, graphics, and/or other content, as may be desired.

In some embodiments, once a user selects buy button 905 (e.g., when such a buy button is displayed in a user interface and selected in the user interface), buy button 905 may take on a new shape and/or be replaced by a purchase confirmation button 910. Purchase confirmation button 910 may, for instance, be displayed in order to confirm that the user wishes to proceed with purchasing and/or being charged for the song or other content item corresponding to buy button 905 and purchase confirmation button 910.

Subsequently, once the user has purchased the song or other content item corresponding to buy button 905 and purchase confirmation button 910, a download button 915 may be displayed in place of buy button 905 and/or purchase confirmation button 910. For example, download button 915 may be displayed in the user interface in which these other buttons were previously displayed. As illustrated in the figures that follow, download button 915 may be displayed in connection with songs and/or other content items that a user has already purchased, and thus may wish to download, rather than re-purchase.

Using these states 900 of a dynamic content access control, greater convenience may be provided to a user who purchases a song or other content item on one device, and subsequently listens to and/or views the same song or other content item on another device (e.g., when such song or other content items is played back via and/or otherwise provided in connection with an internet radio station). For example, a single user account may, in some embodiments, be linked to and/or otherwise associated with a number of different user devices. If a user of an internet radio application were to purchase a particular song or content item on one of the devices linked to his or her user account (e.g., his or her smartphone, such as his or her iPhone®), and subsequently listen to an internet radio station on another device linked to his or her user account (e.g., his or her laptop computer or desktop computer, such as his or her MacBook® or iMac®), it may be more convenient for the user to be presented with a download button (e.g., download button 915), rather than presenting the user with a purchase button (e.g., purchase button 905), in connection with the song or content item that the user has already purchased.

Figure 10:
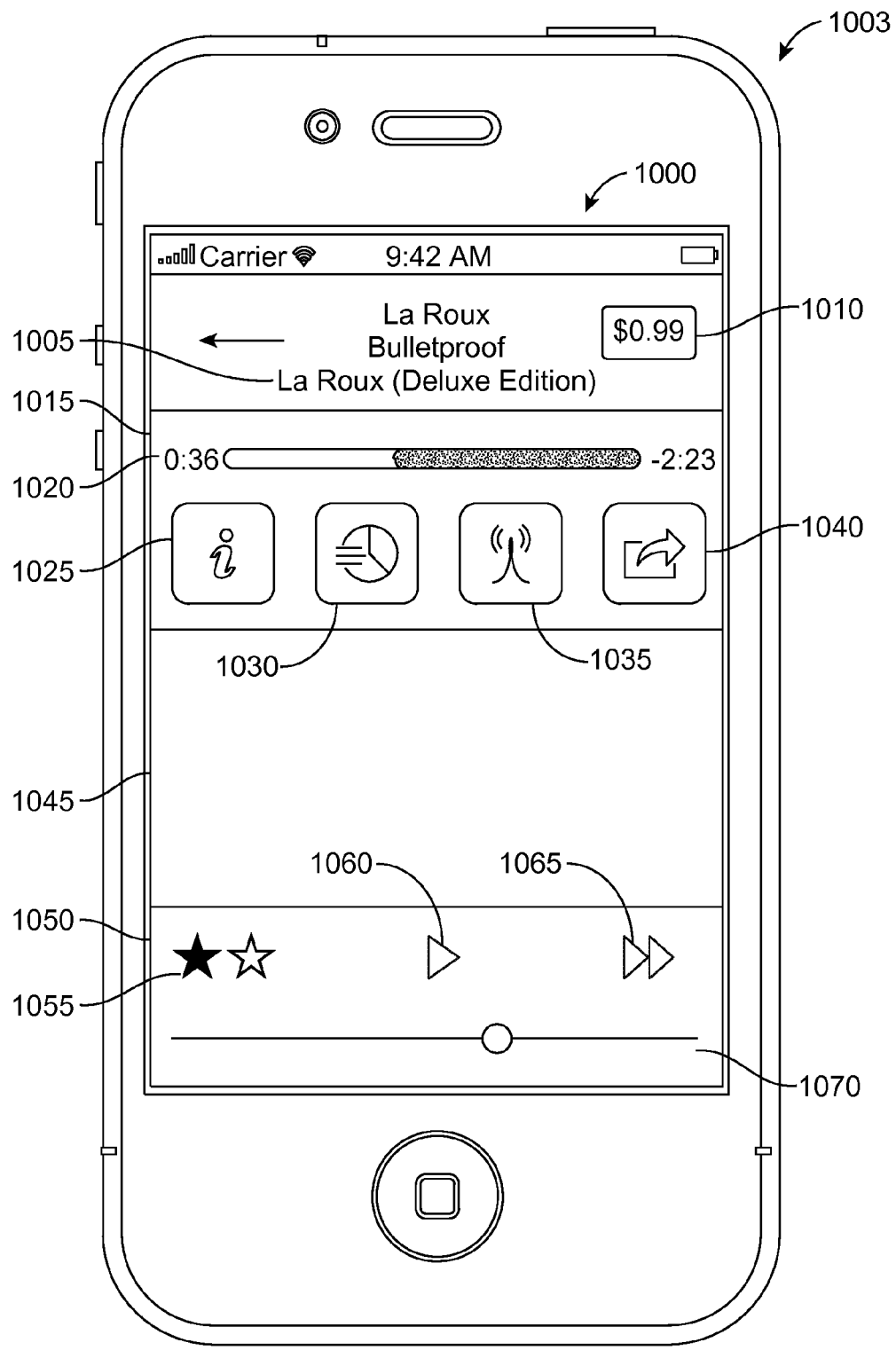
FIGS. 10-15 illustrate example user interfaces that include one or more dynamic content access controls according to some embodiments.
Figure 11:
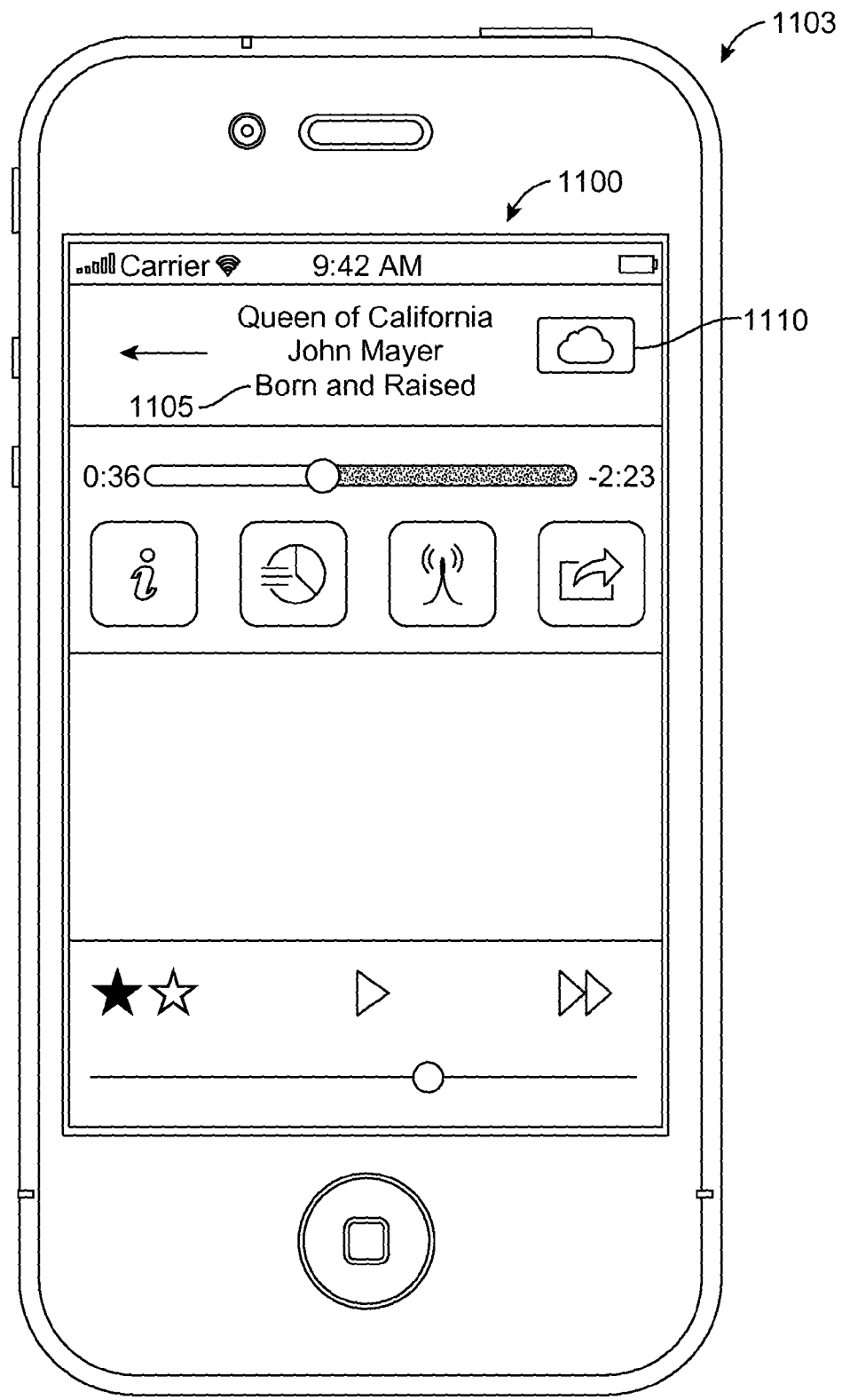
Figure 12:
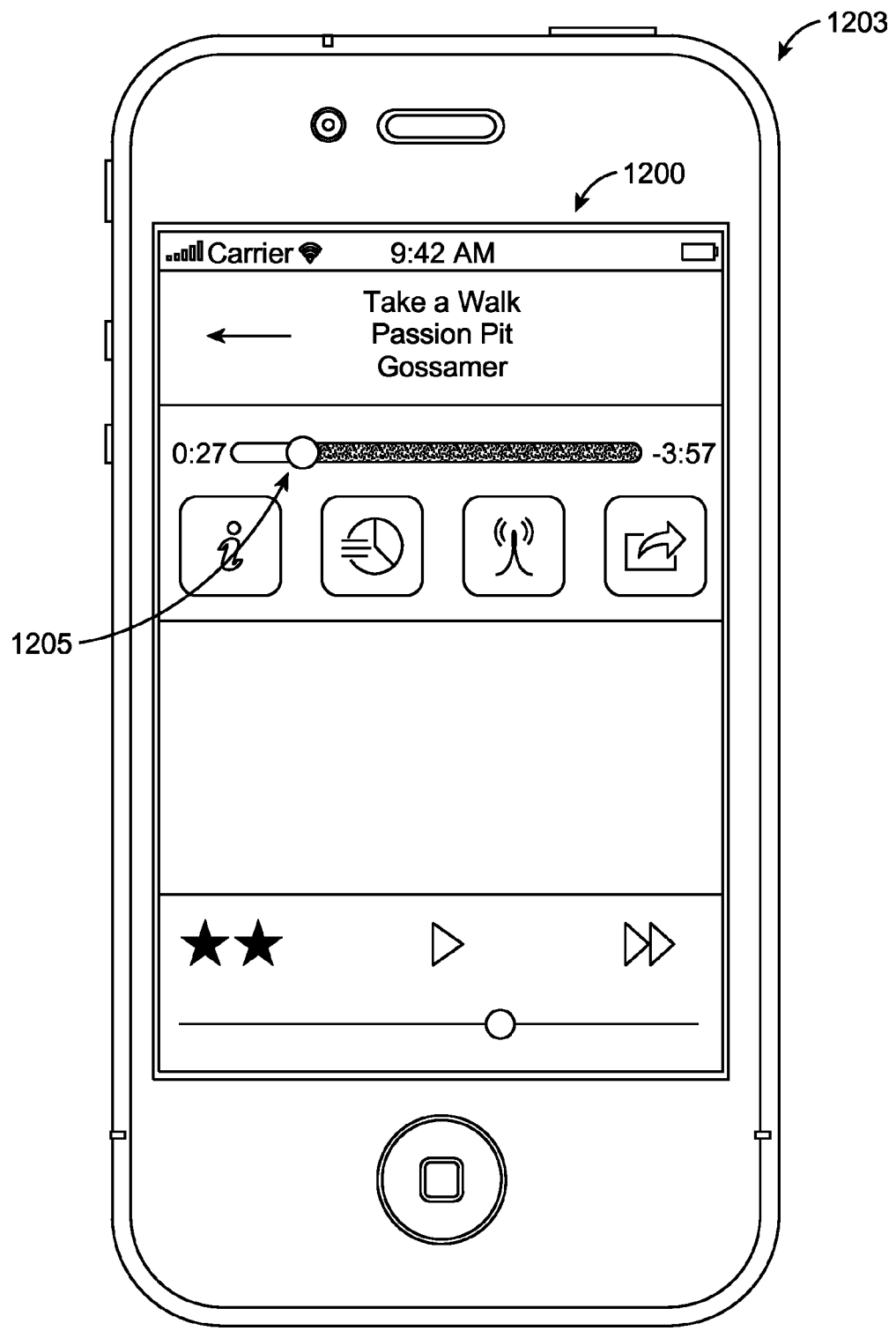
Figure 13:
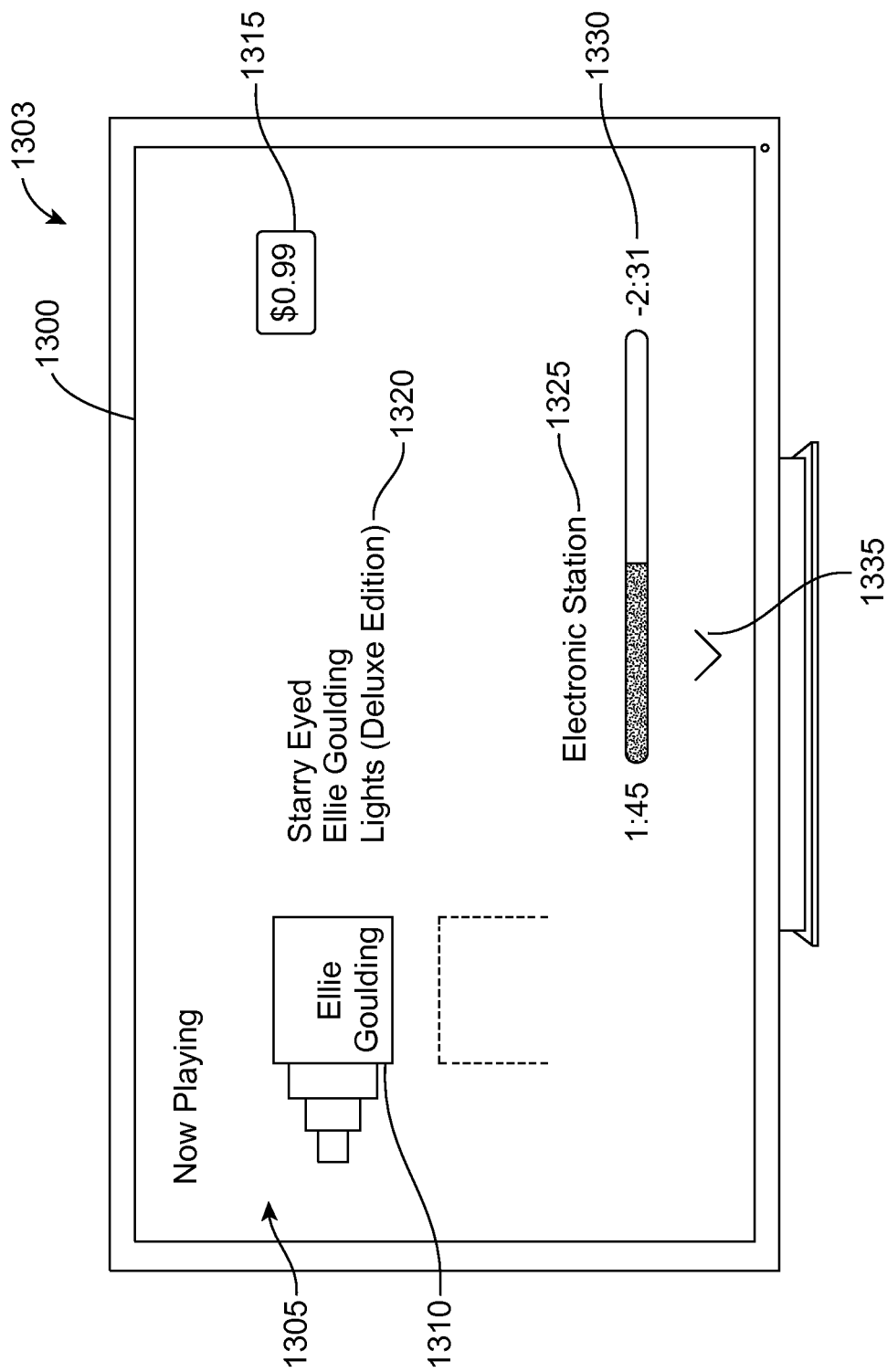
Figure 14:
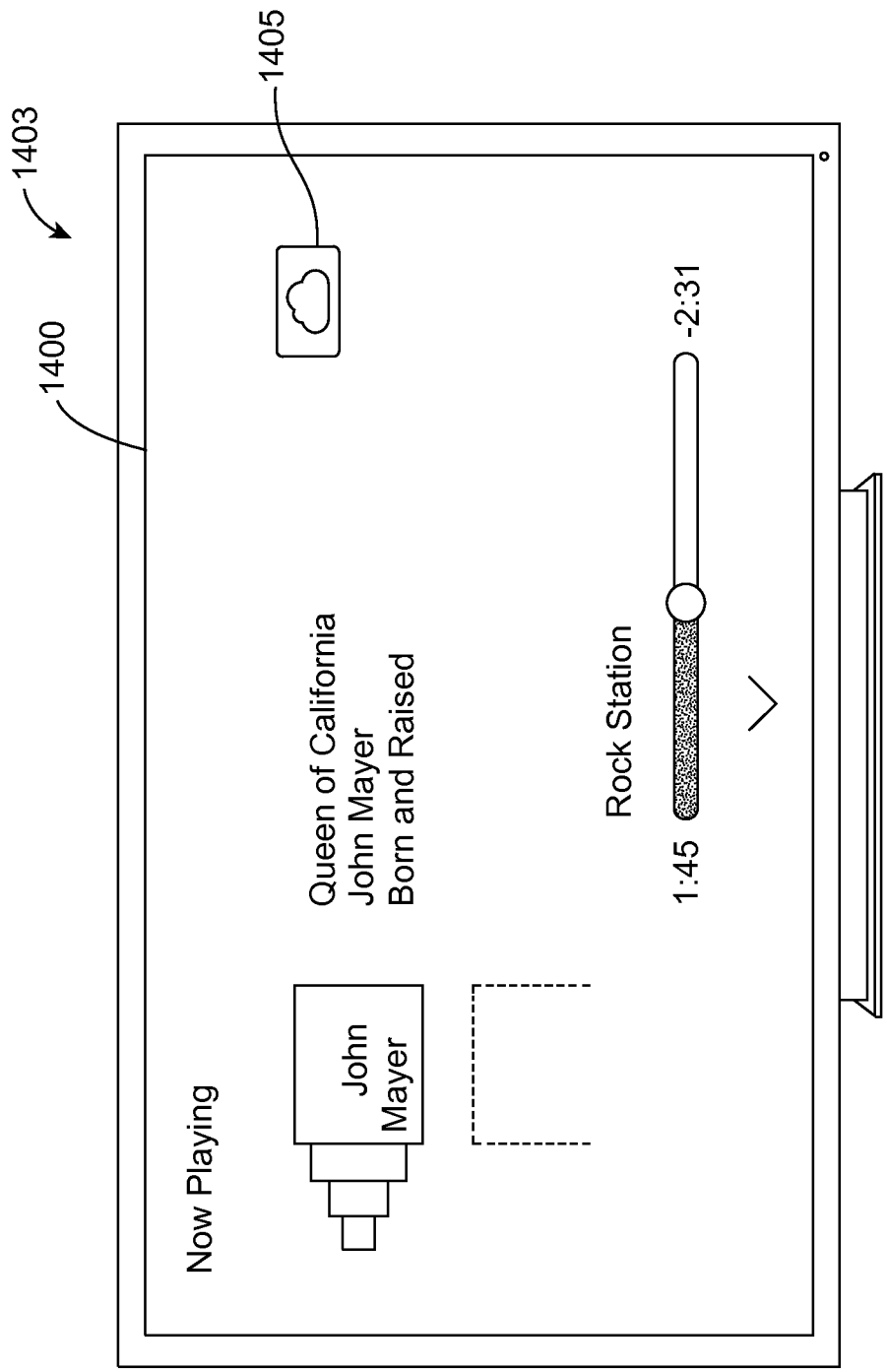
Figure 15:
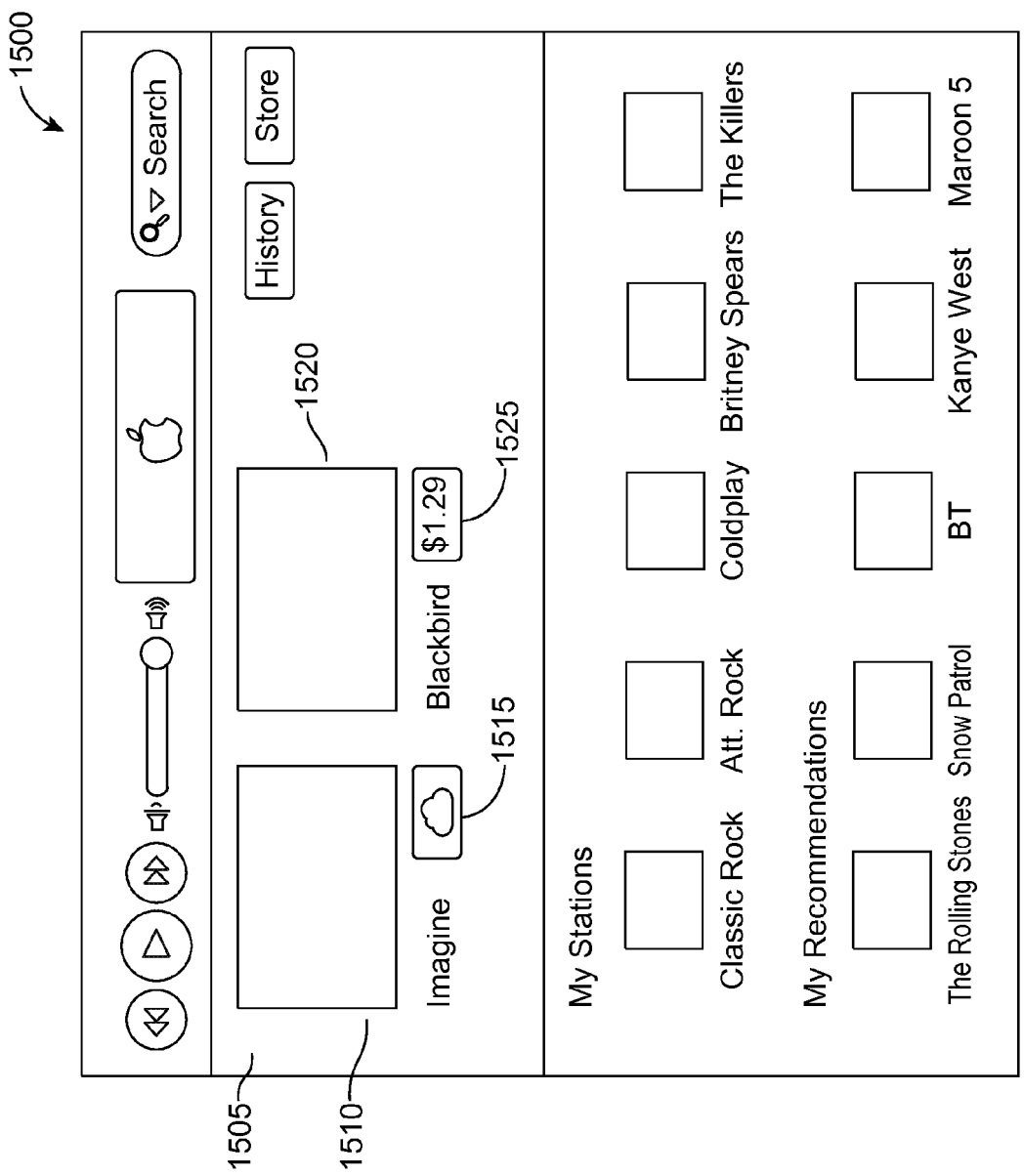

FIGS. 10-15 illustrate example user interfaces that include one or more dynamic content access controls according to some embodiments. In particular, FIGS. 10-12 illustrate example user interfaces that may be provided on a mobile computing device, FIGS. 13 and 14 illustrate example user interfaces that may be provided on a television via a set-top box or similar computing device, and FIG. 15 illustrates an example user interface that may be provided on a tablet computer, laptop computer, and/or desktop computer. While these example user interfaces are described as being provided via particular types of computing devices and/or other hardware components, these computing devices and/or other hardware components are used only as examples. The user interfaces illustrated in FIGS. 10-15 and discussed in greater detail below thus may be provided using any type(s) of computing device(s) and/or other hardware components, as may be desired.

As seen in FIG. 10, user interface 1000 may be displayed by computing device 1003 in providing a dynamic content access control to a user of device 1003. In some embodiments, user interface 1000 may include playback information 1005. Playback information 1005 may, for instance, include text and/or graphic information identifying a song or other content item currently being played back and/or otherwise being provided in connection with an internet radio station. For example, playback information 1005 may include a song name, an artist name, and/or an album name of a currently playing track.

In some embodiments, user interface 1000 may also include a dynamic access control 1010. As seen in FIG. 10, dynamic access control 1010 may appear as a buy button, since purchase history information associated with a user account linked to device 1003 may indicate that a user of the user account has not previously purchased the currently playing song, for example. As discussed above, if the purchase history information associated with the user account of the user indicated that the currently playing song had been previously purchased by the user, then dynamic content access control 1010 may appear as a download button instead of a buy button.

In some embodiments, user interface 1000 further may include a playback control region 1015. Playback control region 1015 may, for instance, include a timeline 1020 that indicates a current playback position of a currently playing song. In some instances, timeline 1020 also may allow a user of device 1003 to jog through various portions of the currently playing song. In other instances, timeline 1020 might not provide such jogging functionality, as a user might be prevented from fast forwarding and/or rewinding through a song or other content item provided via an internet radio station.

In some embodiments, playback control region 1015 may further include a number of different controls for controlling various aspects of an internet radio station and/or an internet radio application. For example, playback control region 1015 may include a song information button 1025, a playback history button 1030, a genius radio button 1035, and/or a share station button 1040. In some instances, song information button 1025 may, when selected, cause a user interface and/or a user interface region that includes additional information about a currently playing song to be displayed. For example, such a user interface and/or user interface region may include information identifying the lyrics of the currently playing song, other information about the currently playing song (e.g., historical and/or biographical information about the song, the artist of the song, and/or the album from which the song is selected), and/or other additional information.

In some instances, playback history button 1030 may, when selected, cause a user interface and/or a user interface region that includes playback history information about one or more internet radio stations to be displayed. Such a user interface and/or user interface region may, for instance, include playback history information that identifies any and/or all of the songs previously provided to a user of a user account via any and/or all internet radio stations associated with the user account.

In some instances, genius radio button 1035 may, when selected, cause a user interface and/or user interface region to be displayed that allows a user to create a new internet radio station. A new internet radio station may, for instance, be created (e.g., by device 1003 and/or system 100) based on the currently playing song, the artist of the currently playing song, the album from which the currently playing song is selected, and/or the genre of the currently playing song. Such a user interface and/or user interface region also may allow a user to specify and/or edit other properties associated with the internet radio station being created, such as a popularity mix of songs to be played back via the internet radio station. The popularity mix may, for example, specify that only popular and/or well-known songs are to be played back via the internet radio station, that a mix of more popular and less popular songs are to be played back via the internet radio station, or that only less popular and/or unknown songs are to be played back via the internet radio station.

In some instances, share station button 1040 may, when selected, cause a user interface and/or a user interface region to be displayed that allows a user to share a currently playing internet radio station with one or more other users. Such sharing may, for instance, be provided via one or more social networking services, and may include posting a URL linking to the internet radio station to such a social networking service. In addition, in sharing an internet radio station, information about content seeds for the internet radio station (e.g., seed songs, seed artists, seed albums, seed genres, etc.), as well as other information about the internet radio station (e.g., liked songs, banned songs, skipped songs, popularity mix settings, etc.), may be shared with one or more recipient users.

In some embodiments, user interface 1000 further may include an album art region 1045. Album art region 1045 may, for instance, display artwork (e.g., album artwork, artist artwork, song artwork, etc.) that corresponds to a currently playing song on the internet radio station, artwork that corresponds to a currently selected song on the internet radio station, and/or artwork that corresponds to the internet radio station itself.

In some embodiments, user interface 1000 further may include an additional playback control region 1050. Playback control region 1050 may, for instance, include a song rating control 1055, a pause-play button 1060, a next track button 1065, and a volume control 1070. In some instances, song rating control 1055 may, when selected, allow a user to toggle through various rating settings for a currently playing song on the internet radio station. For example, using song rating control 1055, a user may be able to assign a zero-star rating to the currently playing song (e.g., indicating that the user does not like or has no opinion on the currently playing song), a one-star rating to the currently playing song (e.g., indicating that the user likes the currently playing song), or a two-star rating to the currently playing song (e.g., indicating that the user strongly likes the currently playing song).

In some instances, pause-play button 1060 may, when selected, allow a user to pause and/or resume playback of a currently playing song on the internet radio station. In addition, next track button 1065 may, when selected, allow a user to skip a currently playing song and cause playback of another song on the internet radio station to begin. Furthermore, volume control 1070 may, for example, allow a user to increase and/or decrease a playback volume of the currently playing song.

FIG. 11 illustrates an example user interface 1100 that may be displayed by computing device 1103 in providing a dynamic content access control to a user of device 1103. As seen in FIG. 11, user interface 1100 may be similar to user interface 1000 depicted in FIG. 10. In the example illustrated in FIG. 11, however, user interface 1100 shows an example in which a song currently playing on an internet radio station has already been purchased by a user of device 1103.

In particular, user interface 1100 may include playback information 1105 that identifies a song or other content item that is both currently being played back in connection with an internet radio station and that has been previously purchased by a user of a user account linked to device 1103. Since purchase history information associated with a user account linked to device 1103 may indicate that the user has previously purchased the currently playing song, a dynamic content access control 1110 may appear in user interface 1100 as a download button (e.g., instead of as a buy button as in the previous example). As discussed above, by selecting dynamic content access control 1110 when it appears as a download button, a user may be able to download one or more files to device 1103 that allow selective playback of the song or other content item (e.g., with respect to which the download button is displayed) at a later time.

In some embodiments, an internet radio application and/or an internet radio system (e.g., system 100) may blend streaming internet radio songs and/or other internet radio content with songs or other content items which have been previously purchased by the user and/or which are included in the user's local content library or cloud content library. This blending may occur in a single content stream associated with a particular internet radio station, such that listening to and/or otherwise playing back the internet radio station involves playing back one or more streaming internet radio songs (e.g., received from a remote server), as well as playing back one or more songs from the user's local content library or cloud content library. In these instances, the appearance and functionality of some user interface elements may be dynamically modified based on the type of media asset (e.g., streaming internet radio song, local content library song, cloud content library song) that is currently being played on the internet radio station.

For example, when an internet radio station is playing a song which the user has not purchased and/or which is not included in the user's local content library (e.g., because the user has not downloaded it) or in the user's cloud content library, then the user might not be able to fast forward, rewind, or otherwise scrub through the song. In these circumstances, a scrub control accordingly might not be displayed in a playback user interface, as the user might not be permitted to scrub through the track. This example situation is illustrated in FIG. 10, for instance, in which a scrub control is not included on the song timeline 1020. On the other hand, when an internet radio station is playing a song which the user has purchased or which is included in the user's local content library or in the user's cloud content library, then the user may be able to fast forward, rewind, and/or otherwise scrub through the song. In these instances, a scrub control may be displayed, as seen in the example illustrated in FIG. 11.

Other aspects of user interfaces and/or user interface elements also may change when an internet radio station is playing a song that is included in a user's local content library. For example, as seen in example user interface 1200 illustrated in FIG. 12, when an internet radio station is playing a song that is included in a user's local content library, the user may be able to fast forward, rewind, and/or otherwise scrub through the track. Accordingly, a scrub control 1205 may be displayed in the user interface to enable the user to control these functionalities. In addition, because the song is already included in the user's local content library (e.g., stored on device 1203), a dynamic content access control (e.g., a buy-download button) might not be displayed in the user interface, as the user has already purchased and/or downloaded the song to the local content library.

In instances in which an internet radio station is playing a particular song that is included in the user's local content library or cloud content library and the particular song subsequently comes to an end, the next song that is selected and played back on the internet radio station may be selected by, and played in accordance with, the internet radio station, rather than the local content library. In other words, the song selection and playback of an internet radio station might not be affected by whether the current or previously playing song is included in a user's local content library or cloud content library. Rather, only the appearance and/or functionality of some user interface elements may vary in these circumstances.

For example, once a song that is currently playing on an internet radio station finishes, the user interface and/or the various user interface elements that are displayed (e.g., by an internet radio system, such as system 100) as the next song begins may vary depending on whether this next song is available in a local content library, in a cloud content library, or only as a streaming internet radio song. For instance, if the next song that begins playing on the internet radio station has not been previously purchased by the user and/or is not included in the user's local content library or cloud content library, then a user interface similar to the one illustrated in FIG. 10 may be displayed (e.g., to provide the user with the option to purchase the song). If, for instance, the next song that begins playing on the internet radio station has been previously purchased by the user, but is not included in the user's local content library, then a user interface similar to the one illustrated in FIG. 11 may be displayed (e.g., to provide the user with the option of downloading the song). And if, for example, the next song that begins playing on the internet radio station is a song that is already included in the user's local content library, then a user interface similar to the one illustrated in FIG. 12 may be displayed (e.g., which may include a scrub control and/or other features, but might not include a buy-download button, as the user already has a local copy of the particular song in this instance).

While a scrub control and a dynamic content access control, such as a buy-download button, are discussed here as examples of user interface elements that may be dynamically included (or not included) in a user interface of an internet radio application depending on whether the song playing on an internet radio station is available in a local content library, in a cloud content library, or only as a streaming internet radio song, the appearance and functionality of other user interface aspects also may be similarly modified. For example, one or more rules may apply to the playback of songs via internet radio stations, such that a user may be able to view and/or preview the next song to be played on an internet radio station when the currently playing song is included in the user's local content library or cloud content library, but might not be able to view and/or preview the next song to be played on an internet radio station when the currently playing song is only available as a streaming internet radio song (e.g., and is not included in the user's local content library or cloud content library). In this example, one or more other user interface controls (e.g., such as one or more controls that enable the viewing and/or previewing of songs) may change in appearance and functionality between playback of different songs, depending on the type of media asset that is currently being played on an internet radio station.

Turning now to FIG. 13, a user interface 1300 is illustrated which depicts an example in which a dynamic content access control is provided to a user of television 1303. In some embodiments, such a user interface may be displayed by television 1303 and related processing (e.g., of the methods and/or method steps discussed above) may be performed by internal components of television 1303, while in other embodiments, such a user interface may be displayed by television 1303 and related processing may be performed by an external computing device, such as a set-top box.

In some embodiments, user interface 1300 may include an album art region 1305, which includes one or more album covers, such as album cover 1310. The album covers included in album art region 1305 may represent the playback history for the currently selected internet radio station, and may, for instance, be displayed increasingly prominently, such that the most prominently displayed album cover corresponds to the currently playing song. Thus, in the example illustrated in FIG. 13, album cover 1310 may correspond to the currently playing song on the internet radio station.

In some embodiments, user interface 1300 may further include a dynamic content access control 1315. Like the dynamic content access controls discussed above with respect to previous examples, dynamic content access control 1315 may appear as a buy button or as a download button, depending on whether purchase history information associated with a user of a user account linked to television 1303 indicates that the user has previously purchased the song that is currently playing on the internet radio station. Thus, in the example illustrated in FIG. 13, the relevant purchase history information may indicate that the user of television 1303 has not previously purchased the currently playing song, and dynamic content access control 1315 accordingly may appear as a buy button.

In some embodiments, user interface 1300 further may include playback information 1320, station information 1325, a timeline 1330, and/or a menu button 1335. In some instances, playback information 1320 may include information identifying a title of a currently playing song, the artist of the currently playing song, and/or an album from which the currently playing song is selected. Station information 1325 may, for instance, include information specifying the name of a current internet radio station, and timeline 1330 may indicate a current playback position of a currently playing song. In addition, menu button 1335 may, when selected, cause a user interface and/or a user interface region to be displayed that allows a user of television 1303 to control various aspects of an internet radio application. The functionalities provided by the various buttons and other controls included in user interface 1300 may be similar to the functionalities provided by similar controls in the other user interfaces discussed above.

FIG. 14 illustrates an example user interface 1400 that may be used in providing a dynamic content access control to a user of television 1403. As seen in FIG. 14, user interface 1400 may be similar to user interface 1300 depicted in FIG. 13. In the example illustrated in FIG. 14, however, user interface 1400 shows an example in which a song currently playing on an internet radio station has already been purchased by a user of device 1403.

In particular, user interface 1400 may include playback information that identifies a song or other content item that is both currently being played back in connection with an internet radio station and that has been previously purchased by a user of a user account linked to device 1403. Since purchase history information associated with a user account linked to device 1403 may indicate that the user has previously purchased the currently playing song, a dynamic content access control 1405 may appear in user interface 1400 as a download button (e.g., instead of as a buy button as in the previous example). As discussed above, by selecting dynamic content access control 1405 when it appears as a download button, a user may be able to download one or more files to device 1403 that allow selective playback of the song or other content item (e.g., with respect to which the download button is displayed) at a later time.

As seen in FIG. 15, example user interface 1500 may be used in providing a dynamic content access control to a user of a tablet computer, a laptop computer, a desktop computer, or any other type of computing device. In some embodiments, user interface 1500 may include a cover flow region 1505. Cover flow region 1505 may, for instance, include album artwork and/or song listings of one or more songs previously played back in connection with and/or otherwise provided via one or more internet radio stations (e.g., as similar to cover flow region 610 of user interface 600 depicted in FIG. 6 and discussed above). For example, cover flow region 1510 may include a first song listing 1510 and a second song listing 1520. In addition, a first dynamic content access control 1515 may be provided in connection with the first song listing 1510, and a second dynamic content access control 1525 may be provided in connection with the second song listing 1520.

Like the dynamic content access controls discussed above with respect to other examples, dynamic content access control 1515 and dynamic content access control 1525 may appear as a buy button or as a download button, depending on whether purchase history information associated with a user of a user account linked to the device providing user interface 1500 indicates that the user has previously purchased the songs corresponding to the respective dynamic content access controls. Thus, in the example illustrated in FIG. 15, a user of a user account linked to the device providing user interface 1500 may have previously purchased the song corresponding to the first song listing 1510, but might not have previously purchased the song corresponding to the second song listing 1520. Accordingly, dynamic content access control 1515 may appear as a download button, while dynamic content access control 1525 may appear as a buy button.

Figure 16:
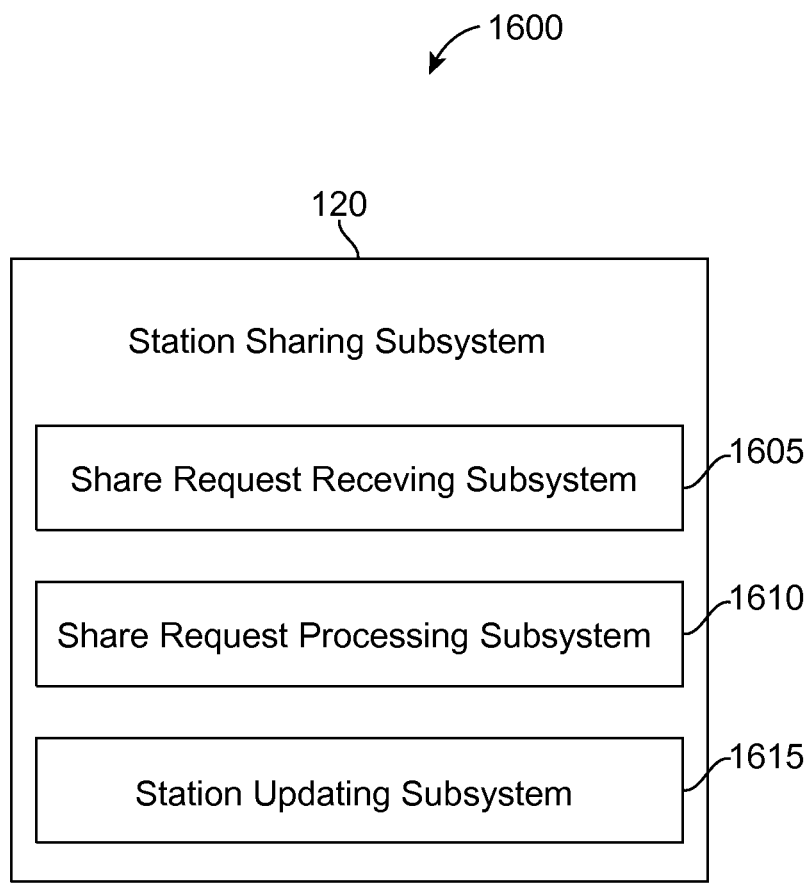
FIG. 16 illustrates a simplified diagram of a station sharing subsystem according to some embodiments.

FIG. 16 illustrates a simplified diagram of a station sharing subsystem 1600 according to some embodiments. In particular, FIG. 16 illustrates a more detailed view of station sharing subsystem 120, which is also depicted in FIG. 1. As seen in FIG. 16, station sharing subsystem 120 may include a number of subsystems, including a share request receiving subsystem 1605, a share request processing subsystem 1610, and a station updating subsystem 1615. One or more communication paths may be provided that enable the one or more subsystems to communicate with and exchange data with one another. The various subsystems depicted in FIG. 16 may be implemented in software, in hardware, or in combinations thereof. In some embodiments, the software may be stored on a transitory or non-transitory computer-readable medium and/or be executed by one or more processors.

In some embodiments, share request receiving subsystem 1605 may enable station sharing subsystem 120 and/or system 100 to receive a request to share an internet radio station. Such a request may, for instance, be received as user input in the form of a selection of a share station button provided in a user interface.

In some embodiments, share request processing subsystem 1610 may enable station sharing subsystem 120 and/or system 100 to process a request to share an internet radio station. For example, share request processing subsystem 1610 may package and/or otherwise encapsulate data associated with the internet radio station to be shared, and subsequently may provide such data to one or more recipient users. In some instances, packaging and/or otherwise encapsulating the data associated with the internet radio station to be shared may include generating one or more data structures in which information about the internet radio station can be stored. Such information may, for example, include information specifying one or more content seeds of the internet radio station, as well as user preferences regarding liked songs, skipped songs, banned songs, and popularity mix settings. In addition, in causing the packaged information to be provided to one or more recipient users, share request processing subsystem 1610 may publish the packaged information (e.g., to one or more servers) so as to make the packaged information available to the one or more recipient users. Additionally, share request processing subsystem 1610 may notify the one or more recipient users that information about the internet radio station has been published. In one example, share request processing subsystem 1610 may publish information about an internet radio station by generating and/or otherwise providing a URL or other link to information describing and/or enabling access to the internet radio station.

In some embodiments, station updating subsystem 1615 may allow one or more recipient users to receive an updated version of the internet radio station, as changes to the internet radio station are made (e.g., by the user who created the internet radio station). For example, as a user adds new content seeds to the internet radio station, removes existing content seeds from the internet radio station, rates songs provided via the internet radio station, skips songs provided via the internet radio station, bans songs from playing on the internet radio station, changes settings related to the popularity mix of songs provided via the internet radio station, and/or modifies other settings associated with the internet radio station, station updating subsystem 1615 may update the previously published information related to the shared internet radio station. For example, station updating subsystem 1615 may repackage data describing the shared internet radio station; republish such information; and/or notify the one or more recipient users, who may, for instance, subscribe to the internet radio station, that the shared internet radio station has been changed.

Figure 17:
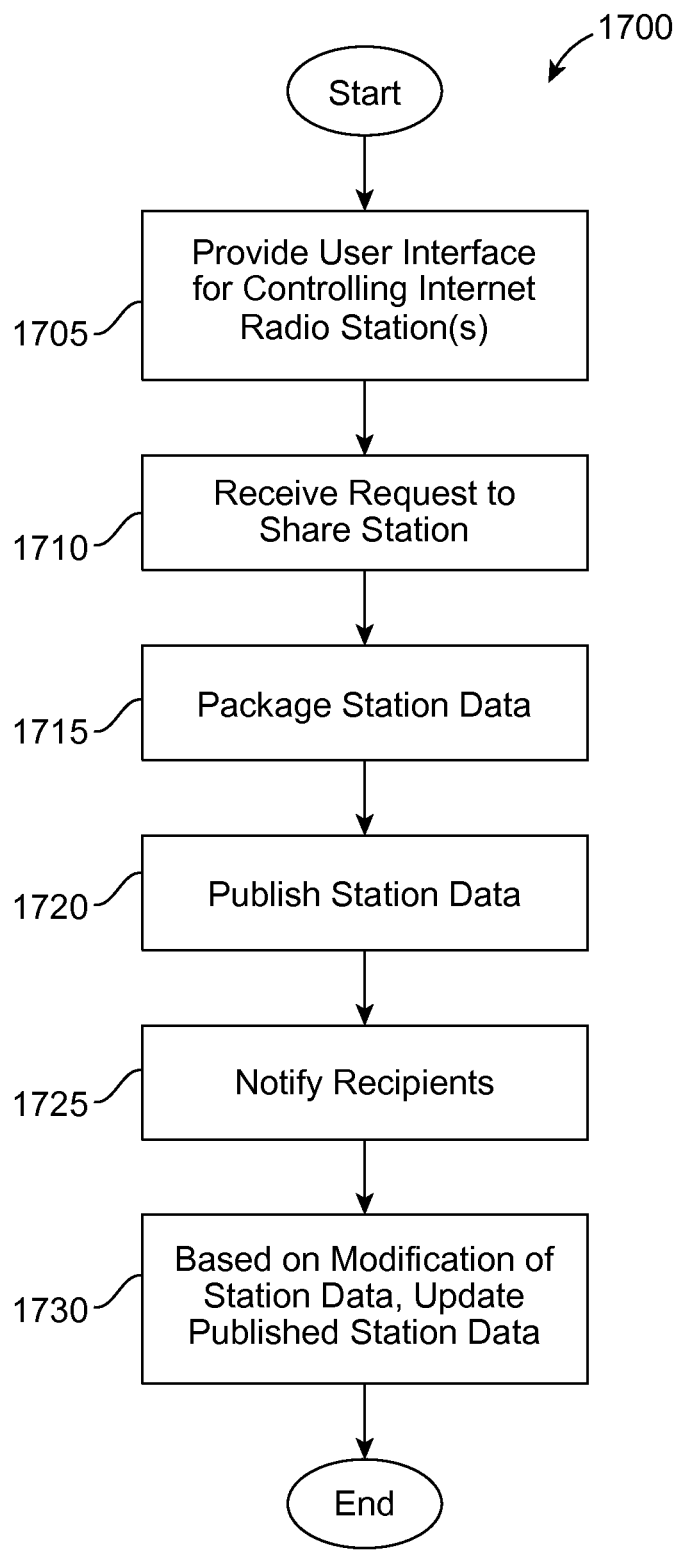
FIG. 17 illustrates a simplified flowchart depicting a method of dynamically updating a shared internet radio station according to some embodiments.

FIG. 17 illustrates a simplified flowchart 1700 depicting a method of dynamically updating a shared internet radio station according to some embodiments. The processing depicted in FIG. 17 may be implemented in software (e.g., code, instructions, programs, etc.) executed by one or more processors, other hardware, or combinations thereof. The software may be stored on a non-transitory computer-readable storage medium. The particular series of processing steps depicted in FIG. 17 is not intended to be limiting.

Using the method illustrated in FIG. 17, a computing device, such as system 100, may be able to provide a user with more convenient ways of sharing an internet radio station. In particular, by using this method, a shared internet radio station may be automatically updated with respect to one or more recipient and/or subscribing users, as the user who created the internet radio station subsequently makes changes to the station after the station has been initially shared. For example, if the user who created the shared internet radio station subsequently changed the content seeds of the internet radio station or other settings affecting what songs are played back via the internet radio station, these changes can be shared with the other users who may listen to the shared internet radio station (e.g., on their own devices). These features may provide the user who initially created and shared the internet radio station with greater control over what is shared via the internet radio station.

As seen in FIG. 17, the method may be initiated in step 1705, in which a user interface for controlling one or more internet radio stations may be provided. In some embodiments, a user interface for controlling one or more internet radio stations may be provided by system 100. For example, system 100 and/or one or more subsystems thereof may generate and/or otherwise draw a user interface that includes one or more controls for controlling one or more internet radio stations. As discussed above, such a user interface may, in some instances, also include controls for controlling playback of content items included in a local content library.

In step 1710, a request to share an internet radio station may be received. For example, in step 1710, a user may submit a request to share an internet radio station currently being provided by system 100 by selecting a share station button included in a user interface. In some instances, such a selection may be received by share request receiving subsystem 1605 as a result of a user of system 100 clicking on or tapping on text, graphics, and/or another indicator representing a share station button.

In step 1715, data associated with the internet radio station to be shared may be packaged. For example, in step 1715, system 100 and/or share request processing subsystem 1610 may package and/or otherwise encapsulate data associated with the internet radio station to be shared. In some instances, this may include creating and/or storing one or more data structures in which information about the internet radio station can be stored. This information may include, for instance, information describing the content seeds of the internet radio station, as well as other settings associated with the internet radio station (e.g., liked songs, skipped songs, banned songs, popularity mix settings, etc.).

In step 1720, the data associated with the internet radio station to be shared may be published. For example, in step 1720, system 100 and/or share request processing subsystem 1610 may publish the data packaged in step 1715 by posting such data to one or more servers.

In step 1725, one or more recipient users of the internet radio station may be notified. For example, in step 1725, system 100 and/or share request processing subsystem 1610 may cause one or more notifications to be sent to intended recipient(s) of the internet radio station, indicating that the internet radio station has been shared and/or is available for playback.

In step 1730, the published station data may be updated, based on data associated with the internet radio station being modified (e.g., by the user who initially created the shared internet radio station). For example, in step 1730, in response to determining that the user who initially created the shared internet radio station has made changes to the previously shared internet radio station (e.g., as a result of changing content seeds for the internet radio station and/or changing other settings associated with the internet radio station), system 100 and/or station updating subsystem 1615 may update the previously published data associated with the internet radio station. In some instances, this updating may include repackaging the data associated with the internet radio station and reposting the updated data to the one or more servers that host information about the internet radio station. In addition, in updating the previously published information about the internet radio station, station updating subsystem 1615 and/or system 100 may cause the one or more recipient users of the shared internet radio station to be notified of the changes to the shared internet radio station.

Figure 18:
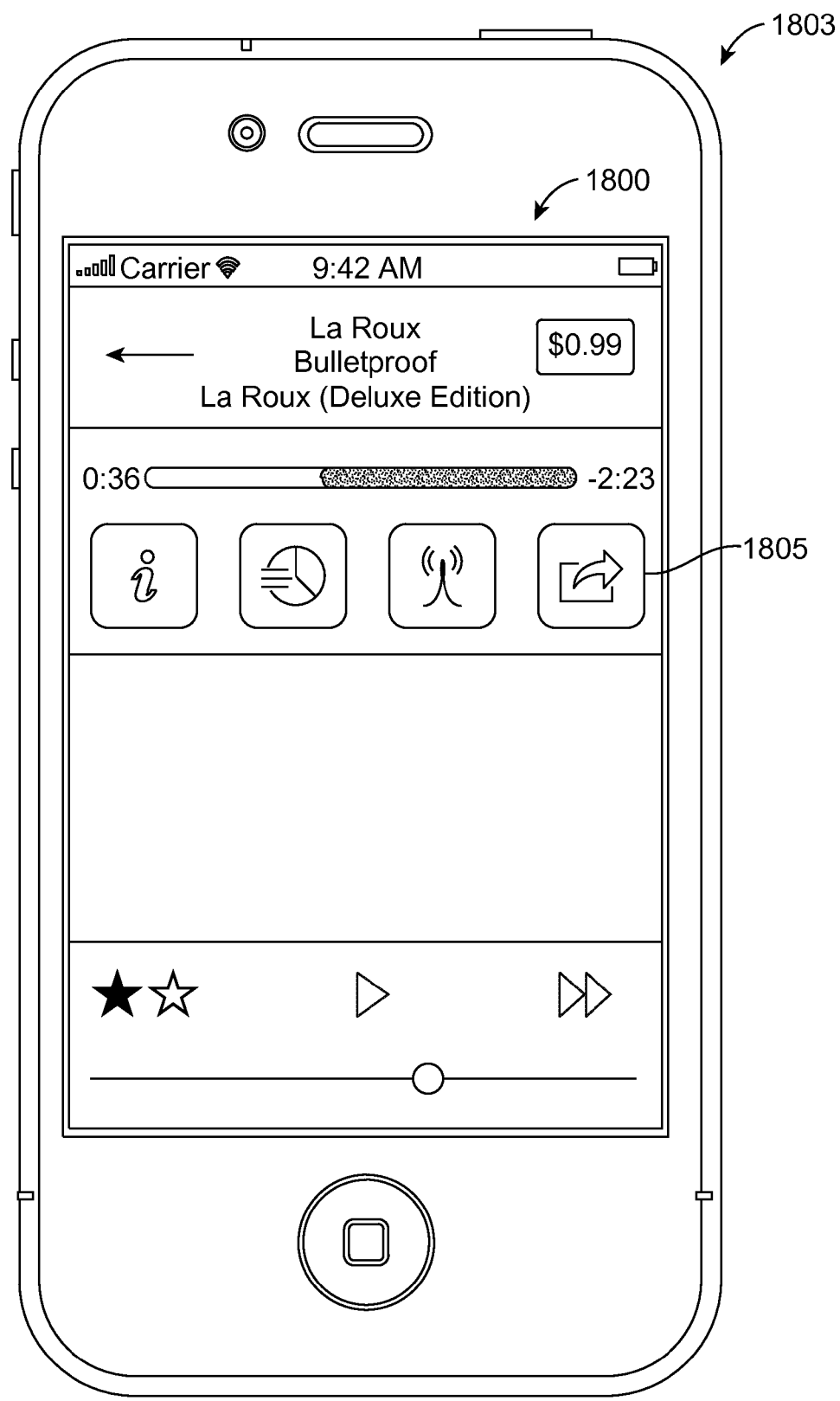
FIGS. 18-20 illustrate example user interfaces that may be used in sharing an internet radio station according to some embodiments.
Figure 19:
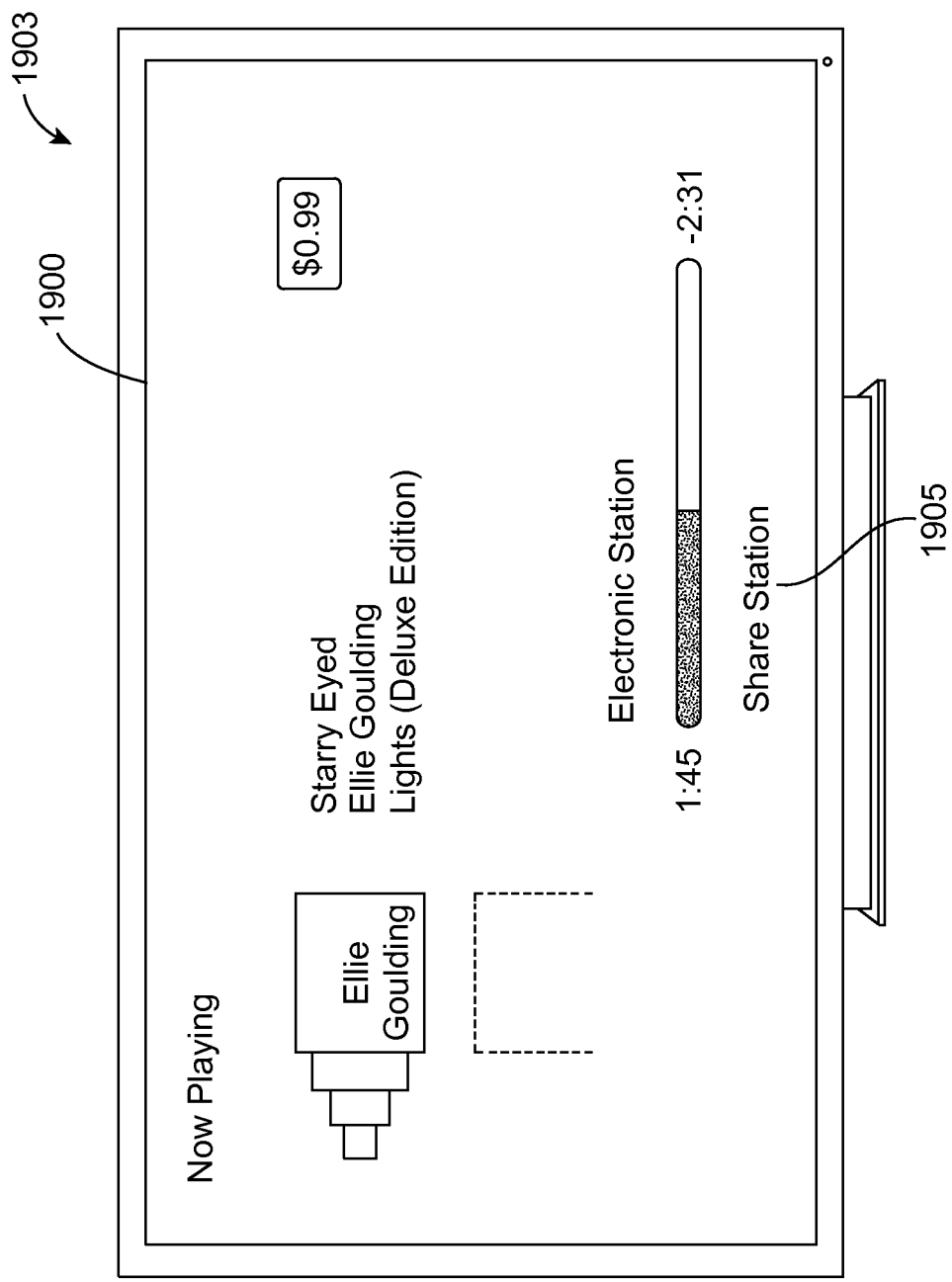
Figure 20:
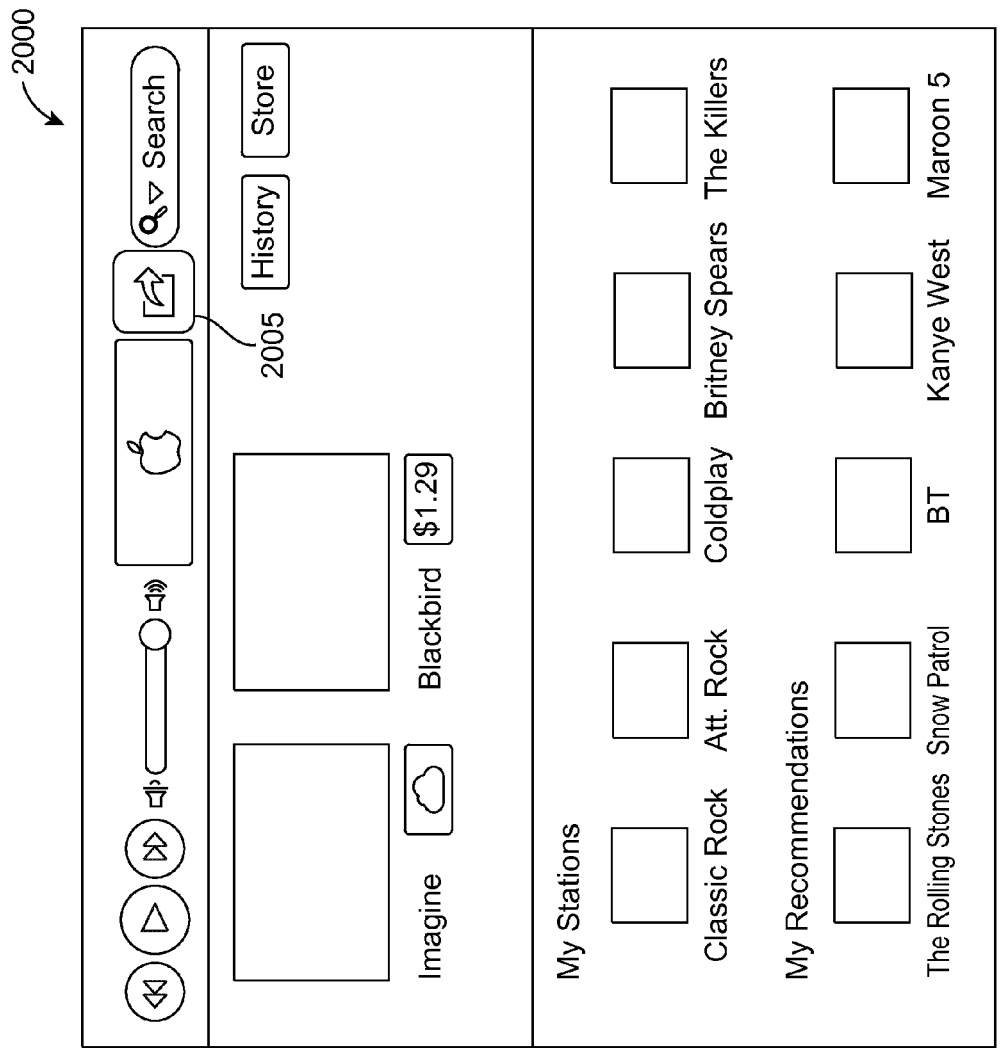

FIGS. 18-20 illustrate example user interfaces that may be used in sharing an internet radio station according to some embodiments. In particular, FIG. 18 illustrates an example user interface 1800 that may be provided on a mobile computing device 1803, FIG. 19 illustrates an example user interface 1900 that may be provided on a television 1903 via a set-top box or similar computing device, and FIG. 20 illustrates an example user interface 2000 that may be provided on a tablet computer, laptop computer, and/or desktop computer. While these example user interfaces are described as being provided via particular types of computing devices and/or other hardware components, these computing devices and/or other hardware components are used only as examples. The user interfaces illustrated in FIGS. 18-20 and discussed in greater detail below thus may be provided using any type(s) of computing device(s) and/or other hardware components, as may be desired.

As seen in FIG. 18, user interface 1800 may be displayed by computing device 1803 in order to enable a user of device 1803 to share an internet radio station that is provided via the user interface. In some embodiments, user interface 1800 may include a share station button 1805, as well as other buttons and other controls similar to those discussed above in previous examples. In some instances, share button 1805 may, when selected, cause device 1803 to share the currently playing internet radio station with one or more recipient users. For example, share station button 1805 may, when selected, cause device 1803 to display a user interface and/or a user interface region via which the user of device 1803 may select one or more internet radio stations to be shared, specify one or more recipient users with whom the internet radio station(s) are to be shared, and/or provide other information related to the request to share the internet radio station(s).

As seen in FIG. 19, user interface 1900 may be displayed by television 1903 in order to enable a user of television 1903 to share an internet radio station that is provided via the user interface. Like user interface 1800 depicted in FIG. 18, user interface 1900 shown in FIG. 19 may include a share station button 1905, as well as other buttons and other controls similar to those discussed above with respect to other user interfaces. In addition, share station button 1905 may provide similar functionalities as share station button 1805. For example, share station button 1905 may, when selected, cause a user interface and/or a user interface region to be displayed that enables a user to share one or more internet radio stations with one or more recipient users.

As seen in FIG. 20, user interface 2000 may be used in allowing a user of a tablet computer, a laptop computer, a desktop computer, or any other type of computing device, to share one or more internet radio stations with one or more recipient users. Like user interface 1800 depicted in FIG. 18 and user interface 1900 depicted in FIG. 19, user interface 2000 of FIG. 20 may include a share station button 2005, as well as other buttons and controls similar to those discussed with respect to the other user interfaces described above. In addition, share station button 2005 may provide functionalities similar to those provided by share station button 1805 and share station button 1905. For example, share station button 2005 may, when selected, cause a user interface and/or a user interface region to be displayed that enables a user to share one or more internet radio stations with one or more recipient users.

Figure 21:
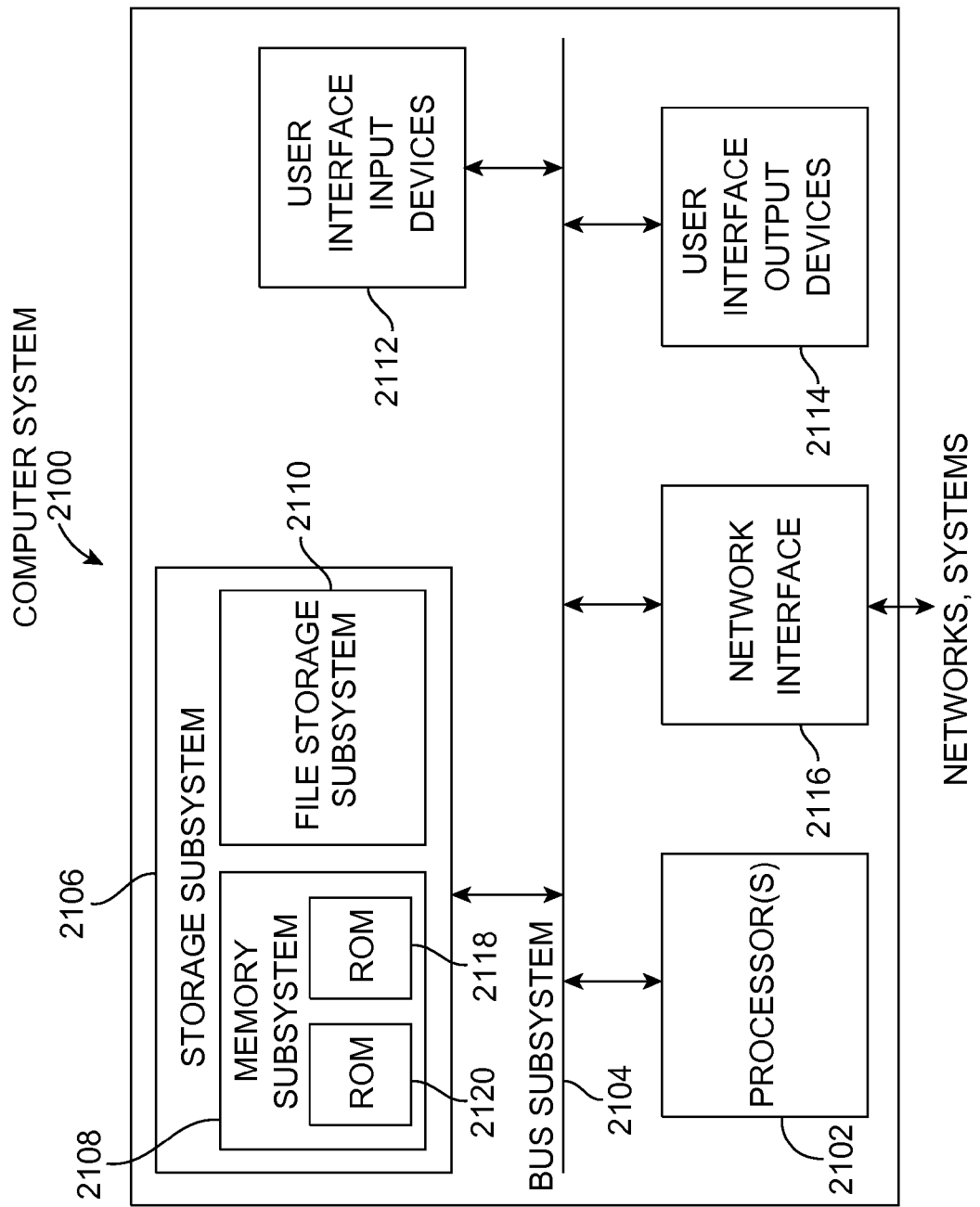
FIG. 21 illustrates a simplified block diagram of a computer system that may incorporate components of an internet radio system according to some embodiments.

As noted above, system 100 of FIG. 1 may incorporate one or more embodiments of the invention and further may provide one or more of the example user interfaces discussed above and/or perform one or more of the methods and/or method steps discussed above. In addition, system 100 may be incorporated into various systems and devices. For instance, FIG. 21 illustrates a simplified block diagram of a computer system that may incorporate one or more components of internet radio system 100 according to some embodiments. As shown in FIG. 21, computer system 2100 may include one or more processors 2102 that communicate with a number of peripheral subsystems via a bus subsystem 2104. These peripheral subsystems may include a storage subsystem 2106, including a memory subsystem 2108 and a file storage subsystem 2110, user interface input devices 2112, user interface output devices 2114, and a network interface subsystem 2116.

Bus subsystem 2104 may provide a mechanism for letting the various components and subsystems of computer system 2100 communicate with each other as intended. Although bus subsystem 2104 is shown schematically as a single bus, alternative embodiments of the bus subsystem may utilize multiple buses.

The one or more processors 2102, which can be implemented as one or more integrated circuits (e.g., as a conventional microprocessor or microcontroller), can control the operation of computer system 2100. In various embodiments, the one or more processors 2102 can execute a variety of programs in response to program code and can maintain multiple concurrently executing programs or processes. At any given time, some or all of the programs to be executed can reside in processor 2102 and/or in storage subsystem 2106. Through suitable programming, processor 2102 can provide various functionalities described above, such as, for instance, providing one or more internet radio stations.

Network interface subsystem 2116 may provide an interface to other computer systems and networks. Network interface subsystem 2116 may serve as an interface for receiving data from and transmitting data to other systems from computer system 2100. For example, network interface subsystem 2116 may enable computer system 2100 to connect a client device via the Internet. In some embodiments, network interface 2116 can include radio frequency (RF) transceiver components for accessing wireless voice and/or data networks (e.g., using cellular telephone technology, advanced data network technology such as 3G, 4G, or EDGE, WiFi (IEEE 802.11 family standards, or other mobile communication technologies, or any combination thereof), GPS receiver components, and/or other components. In some embodiments, network interface 2116 may provide wired network connectivity (e.g., Ethernet) in addition to or instead of a wireless interface.

User interface input devices 2116 may include a keyboard, pointing devices such as a mouse or trackball, a touchpad, or touch screen incorporated into a display, a scroll wheel, a click wheel, a dial, a button, a switch, a keypad, audio input devices such as voice recognition devices, microphones, and other types of input devices. In general, use of the term "input device" is intended to include all possible types of devices and mechanisms for inputting information to computer system 2100.

User interface output devices 2114 may include a display subsystem, one or more indicator lights, and/or non-visual displays, such as audio output devices. The display subsystem may be a cathode ray tube (CRT), a flat-panel device such as a liquid crystal display (LCD), a projection device, a touch screen, and the like. In general, the use of the term "output device" is intended to include all possible types of devices and mechanisms for outputting information from computer system 2100.

Storage subsystem 2106 may provide a computer-readable storage medium for storing the basic programming and data constructs that provide the functionality of some embodiments. Storage subsystem 2106 can be implemented, e.g., using disk, flash memory, or any other storage media in any combination, and can include volatile and/or non-volatile storage as desired. Software (e.g., programs, code modules, instructions, etc.) that when executed by a processor provide the functionalities described herein may be executed by processor(s) 2102. Storage subsystem 2106 may also provide a repository for storing data used in accordance with some embodiments. Storage subsystem 2106 may include memory subsystem 2108 and file/disk storage subsystem 2110.

Memory subsystem 2108 may include a number of memories including a main random access memory (RAM) 2118 for storage of instructions and data during program execution and a read only memory (ROM) 2120 in which fixed instructions may be stored. File storage subsystem 2110 may provide persistent (e.g., non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 2100 can be of various types, including a personal computer, a personal device (e.g., an iPhone®, an iPad®, etc.), a workstation, a network computer, a mainframe, a kiosk, a server, a set-top box (e.g., an Apple TV®), or any other data processing system. Due to the ever-changing nature of computers and networks, the description of computer system 2100 depicted in FIG. 21 is intended only as a specific example. Many other configurations having more or fewer components than the system depicted in FIG. 21 are possible.

Various embodiments described herein can be realized using any combination of dedicated components and/or programmable processors and/or other programmable devices. The various embodiments may be implemented only in hardware, only in software, or using combinations thereof. The various processes described herein may be implemented on the same processor or different processors in any combination. Accordingly, where components are described as being configured to perform certain operations, such configuration can be accomplished, for instance, by designing electronic circuits to perform the operation, by programming programmable electronic circuits, such as microprocessors, to perform the operation, or any combination thereof. Processors can communicate using a variety of techniques, including, but not limited to, conventional techniques for inter-processor communication, and different pairs of processors may use different techniques, or the same pair of processors may use different techniques at different times. Further, while the embodiments described herein may make reference to specific hardware and software components, different combinations of hardware and/or software components may also be used, and particular operations described as being implemented in hardware might also be implemented in software, or vice versa.

The various embodiments discussed herein are not restricted to operation with certain specific data processing environments, but may be free to operate within a number of data processing environments. In addition, while the invention has been described with respect to specific embodiments, one skilled in the art will recognize that numerous modifications are possible. For example, in some configurations, a distributed model may be used to provide one or more of the features discussed herein. For example, in some embodiments, system 100 may be configured as a distributed system in which one or more components of system 100 are distributed and coupled via one or more networks.

Figure 22:
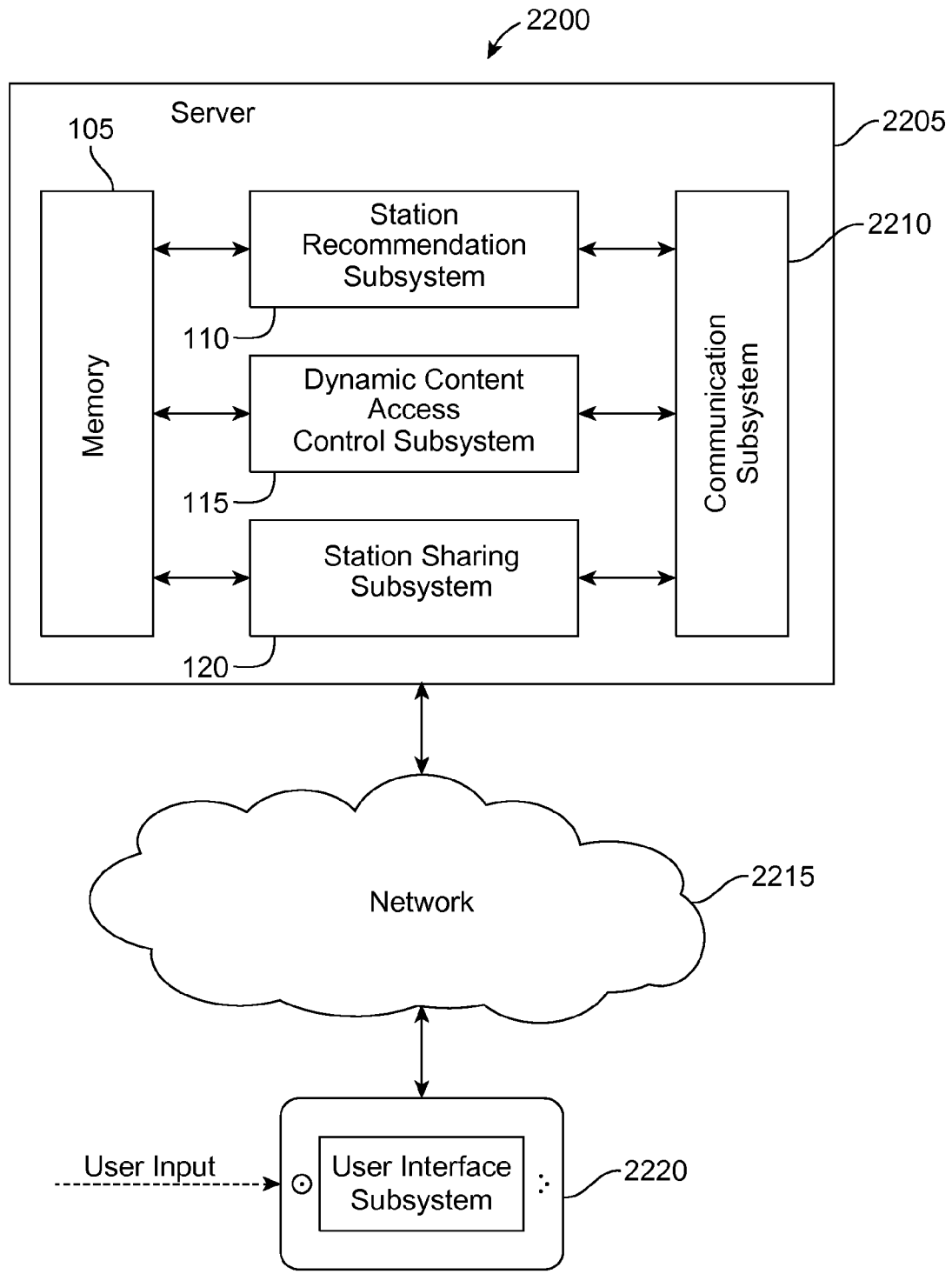
FIG. 22 illustrates a simplified diagram of a distributed system for providing internet radio according to some embodiments.

FIG. 22 illustrates a simplified diagram of a distributed system 2200 for providing internet radio according to some embodiments. In the embodiment illustrated in FIG. 22, memory 105, station recommendation subsystem 110, dynamic content access control subsystem 115, and station sharing subsystem 120 are provided on a server 2205 that includes a communication subsystem 2210 and is communicatively coupled, via a network 2215, with a remote client device 2220. Remote client device 2220 may, for instance, include a user interface subsystem similar to user interface subsystem 125.

Network 2215 may include one or more communication networks, which can be the Internet, a local area network (LAN), a wide area network (WAN), a wireless or wired network, an Intranet, a private network, a public network, a switched network, or any other suitable communication network. Network 2215 may include many interconnected systems and communication links, including, but not limited to, hardware links, optical links, satellite or other wireless communication links, wave propagation links, or any other ways for communication of information. Various communication protocols may be used to facilitate communication of information via network 2215, including, but not limited to, TCP/IP, HTTP protocols, extensible markup language (XML), wireless application protocol (WAP), protocols under development by industry standard organizations, vendor-specific protocols, customized protocols, and others.

In the configuration illustrated in FIG. 22, one or more user interfaces may be provided to a user via remote client device 2220, and user input from the user may be received via such user interfaces. In addition, data may be sent from remote client device 2220 to server 2205, and from server 2205 to remote client device 2220, to provide the various functionalities and features described above. For example, processing performed by server 2205 may enable one or more recommended internet radio stations to be provided on remote client device 2220. In addition, processing performed by server 2205 may enable one or more dynamic content access controls to be provided on remote client device 2220. Furthermore, processing performed by server 2205 may enable one or more stations shared by a user of remote client device 2220 to be automatically updated as the user modifies settings related to those shared internet radio stations.

In the configuration illustrated in FIG. 22, memory 105, station recommendation subsystem 110, dynamic content access control subsystem 115, and station sharing subsystem 120 are located remotely from remote client device 2220, and server 2205 may provide the various functionalities and features described above for remote client device 2220. In some embodiments, server 2220 may provide these functionalities and features for multiple remote client devices. The multiple remote client devices may be served concurrently or in a serialized manner. In some embodiments, the services provided by server 2205 may be offered as web-based or cloud services or under a Software as a Service (SaaS) model.

Various different distributed system configurations are possible, which may be different from distributed system 2200 depicted in FIG. 22. For example, in some embodiments, memory 105, station recommendation subsystem 110, dynamic content access control subsystem 115, and station sharing subsystem 120 may all be located remotely from each other. The embodiment illustrated in FIG. 22 is thus only one example of a system that may incorporate some embodiments and is not intended to be limiting.

Embodiments described herein provide internet radio functionalities and user interface features that allow a user to more easily and conveniently use internet radio services and applications. As noted above, while the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A computer-implemented method for allowing access to media content on an internet radio station, the method comprising:
generating, by a processor, a user interface that includes one or more regions configured to control playback of the internet radio station;
displaying, by the processor, the user interface on a display device;
determining, by the processor, whether a selected media content associated with the internet radio station has been previously purchased based on a music purchase history associated with a user account;
displaying, by the processor, a user-selectable control on the user interface, the user-selectable control to enable a purchase or download of the selected media content;
in response to determining that the selected media content has not been previously purchased;

assigning, by the processor, a first functional state to the user-selectable control that enables the selected media content to be purchased;

modifying, by the processor in accordance with the assigned first functional state, the function of the user-selectable control such that the user-selectable control is configured to cause the selected media content to be purchased responsive to its selection; and modifying, by the processor, an appearance of the user-selectable control to correspond to a purchasing symbol of the selected media content; and in response to determining that the selected media content has been previously purchased;

assigning, by the processor, a second functional state to the user-selectable control that enables the selected media content to be downloaded;

modifying, by the processor in accordance with the assigned second functional state, the function of the user-selectable control such that the user-selectable control is configured to cause the selected media content to be downloaded responsive to its selection; and modifying, by the processor, the appearance of the user-selectable control to correspond to an image associated with downloading the selected media content.

2. The method of claim 1, further comprising:
in response to receiving a selection of the user-selectable control that enables the selected media content to be purchased:
charging the user account for purchasing the selected media content; and
initiating the downloading of the selected media content to a content library accessible via the user interface.

3. The method of claim 1, further comprising:
in response to receiving a selection of the user-selectable control that enables the selected media content to be downloaded, initiating downloading of the selected media content to a content library accessible via the user interface.

4. The method of claim 1, wherein the user interface further includes one or more regions configured to control playback of content items included in a content library associated with the user account.

5. The method of claim 4, wherein the content library is locally stored, at least in part, on a device providing the user interface.

6. A system for allowing access to media content on an internet radio station, the system comprising:
a memory; and
one or more processors coupled to the memory, the one or more processors configured to:
generate a user interface that includes one or more regions configured to control playback of the internet radio station;
display the user interface on a display device;
determine whether a selected media content associated with the internet radio station has been previously purchased based on a music purchase history associated with a user account;
display a user-selectable control on the user interface, the user-selectable control to enable a purchase or download of the selected media content;
in response to determining that the selected media content has not been previously purchased;
assign, by the processor, a first functional state to the user-selectable control that enables the selected media content to be purchased;

modify, by the processor in accordance with the assigned first functional state, the function of the user-selectable control such that the user-selectable control is configured to cause the selected media content to be purchased responsive to its selection; and modify, by the processor, an appearance of the user-selectable control to correspond to a purchasing symbol of the selected media content; and in response to determining that the selected media content has been previously purchased;

assign, by the processor, a second functional state to the user-selectable control that enables the selected media content to be downloaded;

modify, by the processor in accordance with the assigned second functional state, the function of the user-selectable control such that the user-selectable control is configured to cause the selected media content to be downloaded responsive to its selection; and modify, by the processor, the appearance of the user-selectable control to correspond to an image associated with downloading the selected media content.

7. The system of claim 6, wherein the user interface further includes one or more regions configured to control playback of content items included in a content library associated with the user account.

8. The system of claim 7, wherein the content library is locally stored, at least in part, by the system.

9. The system of claim 6, wherein the one or more processors are further configured to register the system as being linked to the user account.

10. A non-transitory computer-readable storage memory storing a plurality of instructions for controlling one or more processors, the plurality of instructions comprising:
instructions that cause at least one processor of the one or more processors to generate a user interface that includes one or more regions configured to control playback of the internet radio station;
instructions that cause at least one processor of the one or more processors to display the user interface on a display device;
instructions that cause at least one processor of the one or more processors to determine, whether a selected media content associated with the internet radio station has been previously purchased based on a music purchase history associated with a user account;
instructions that cause at least one processor of the one or more processors to display a user-selectable control on the user interface, the user-selectable control to enable a purchase or download of the selected media content;
in response to determining that the selected media content has not been previously purchased, instructions that cause at least one processor of the one or more processors to:
assign, by the processor, a first functional state to the user-selectable control that enables the selected media content to be purchased;
modify, by the processor in accordance with the assigned first functional state, the function of the user-selectable control such that the user-selectable control is configured to cause the selected media content to be purchased responsive to its selection; and
modify, by the processor, an appearance of the user-selectable control to correspond to a purchasing symbol of the selected media content; and in response to determining that the selected media content has been previously purchased, instructions that cause at least one processor of the one or more processors to:

assign, by the processor, a second functional state to the user-selectable control that enables the selected media content to be downloaded;

modify, by the processor in accordance with the assigned second functional state, the function of the user-selectable control such that the user-selectable control is configured to cause the selected media content to be downloaded responsive to its selection; and modify, by the processor, the appearance of the user-selectable control to correspond to an image associated with downloading the selected media content.

11. The non-transitory computer readable storage memory of claim 10, wherein the plurality of instructions further comprises:

instructions that cause at least one processor of the one or more processors to provide, in the user interface, one or more regions configured to control sharing of the internet radio station with one or more other user accounts.

12. The non-transitory computer readable storage memory of claim 10, wherein the plurality of instructions further comprises:

instructions that cause at least one processor of the one or more processors to provide, in the user interface, one or more regions configured to control creation of a new internet radio station based on the selected media content.

13. The non-transitory computer readable storage memory of claim 10, wherein the plurality of instructions further comprises:

instructions that cause at least one processor of the one or more processors to provide, in the user interface, one or more regions configured to control displaying of the selected media content in an online music store.

14. The non-transitory computer readable storage memory of claim 10, wherein the plurality of instructions further comprises:

instructions that cause at least one processor of the one or more processors to provide, in the user interface, one or more regions configured to control displaying of an internet radio playback history associated with the user account.

15. A computer-implemented method for allowing access to media content on an internet radio station, the method comprising:

generating, by a processor, at a computing device linked to a user account, a user interface that includes one or more regions configured to control playback of the internet radio station;

displaying, by the processor, the user interface on a display device;

receiving, by the processor, a selection of a content item provided through the internet radio station;

accessing a purchase history associated with the user account;

determining, by the processor, whether the user account has a right to download the content item based on the purchase history associated with the user account;

displaying, by the processor, a selectable button on the user interface, the selectable button to enable a purchase or download of the selected content item;

in response to determining that the user account has the right to download the content item:

assigning, by the processor, a first functional state to the selectable button in the user interface that enables the selected content item to be downloaded;

modifying, by the processor in accordance with the assigned first functional state, the function of the selectable button in the user interface such that, when selected, the selectable button is configured to cause the content item to be downloaded to a content library accessible to the computing device;

modifying, by the processor, an appearance of the selectable button to correspond to an image associated with downloading the content item; and in response to determining that the user account does not have the right to download the content item:

assigning, by the processor, a second functional state to the selectable button in the user interface that enables the selected content item to be purchased;

modifying, by the processor in accordance with the assigned second functional state, the function of the selectable button in the user interface such that, when selected, the selectable button is configured to initiate a purchase process for the content item;

modifying, by the processor, an appearance of the selectable button to correspond to a purchase price for the content item.

16. The method of claim 15, wherein the purchase process includes:

authenticating a user of the computing device;

charging the user account for purchasing the content item; and causing the content item to be downloaded to the content library.

17. The method of claim 15, wherein the content library is stored, at least in part, on the computing device.

18. The method of claim 15, wherein the user interface further includes one or more regions configured to control playback of one or more content items included in the content library.

19. The method of claim 15, wherein the user interface further includes one or more regions configured to rate the content item.

20. A system linked to a user account, comprising:

a video display;

a memory; and one or more processors coupled to the memory, the one or more processors configured to:

generate a user interface that includes one or more regions configured to control playback of the internet radio station;

display the user interface on the video display;

receive a selection of a content item provided through the internet radio station;

access a purchase history associated with the user account;

determine, based on the purchase history associated with the user account, whether the user account has a right to download the content item;

display a selectable button on the user interface, the selectable button to enable a purchase or download of the selected content item;

in response to determining that the user account has the right to download the content item:

assign, by the processor, a first functional state to the selectable button in the user interface that enables the selected content item to be downloaded;

modify, by the processor in accordance with the assigned first functional state, the function of the selectable button in the user interface such that, when selected, the selectable button is configured to cause the content item to be downloaded to a content library accessible to the computing device;

modify, by the processor, an appearance of the selectable button to correspond to an image associated with downloading the content item; and in response to determining that the user account does not have the right to download the content item:

assign, by the processor, a second functional state to the selectable button in the user interface that enables the selected content item to be purchased;

modify, by the processor in accordance with the assigned second functional state, the function of the selectable button in the user interface such that, when selected, the selectable button is configured to initiate a purchase process for the content item;

modify, by the processor, an appearance of the selectable button to correspond to a purchase price for the content item.

21. The system of claim 20, wherein the one or more regions configured to control playback of the internet radio station include at least one region that enables a content seed to be added to the internet radio station.

22. The system of claim 20, wherein the one or more regions configured to control playback of the internet radio station include at least one region that enables a content item to be added to a list of content items that are not to be played on the internet radio station.

23. The system of claim 20, wherein the one or more regions configured to control playback of the internet radio station include at least one region that enables a popularity mix to be specified for the internet radio station.

24. The system of claim 20, wherein the one or more regions configured to control playback of the internet radio station include at least one region that enables the content item to be accessed in an online music store.

* * * * *